United States Patent
Jang et al.

(10) Patent No.: US 11,588,988 B2
(45) Date of Patent: Feb. 21, 2023

(54) IMAGE SENSOR AND BINNING METHOD THEREOF

(71) Applicant: SAMSUNG ELECTRONICS CO., LTD., Suwon-si (KR)

(72) Inventors: Chanyoung Jang, Pohang-si (KR); Hee Kang, Hwaseong-si (KR); Wooseok Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/338,082

(22) Filed: Jun. 3, 2021

(65) Prior Publication Data

US 2021/0409623 A1 Dec. 30, 2021

(30) Foreign Application Priority Data

Jun. 26, 2020 (KR) .................. 10-2020-0078813

(51) Int. Cl.
*H04N 5/347* (2011.01)
*H04N 5/3745* (2011.01)
*H04N 5/378* (2011.01)

(52) U.S. Cl.
CPC ............ *H04N 5/347* (2013.01); *H04N 5/378* (2013.01); *H04N 5/37455* (2013.01)

(58) Field of Classification Search
CPC ............... H04N 5/347; H04N 5/36963; H04N 5/37455; H04N 5/378
See application file for complete search history.

(56) References Cited

U.S. PATENT DOCUMENTS

| | | | |
|---|---|---|---|
| 7,929,807 B2 | 4/2011 | Andersen | |
| 8,780,238 B2 | 7/2014 | Bowers | |
| 9,001,233 B2 * | 4/2015 | Kasai | H04N 5/35554 348/308 |
| 9,137,452 B2 | 9/2015 | Han | |
| 9,584,742 B2 | 2/2017 | Park et al. | |
| 10,109,037 B1 | 10/2018 | Huang | |
| 11,323,640 B2 * | 5/2022 | Kim | H04N 5/347 |
| 2006/0243890 A1 | 11/2006 | Bock | |
| 2008/0260291 A1 * | 10/2008 | Alakarhu | H04N 9/04557 348/E9.01 |
| 2011/0176045 A1 | 7/2011 | Ahn et al. | |
| 2015/0350580 A1 * | 12/2015 | Sato | H04N 5/374 348/294 |

* cited by examiner

*Primary Examiner* — Lin Ye
*Assistant Examiner* — Chriss S Yoder, III
(74) *Attorney, Agent, or Firm* — Sughrue Mion, PLLC

(57) ABSTRACT

The binning method of an image sensor includes reading out a plurality of pixel signals from at least two rows of each of a plurality of areas of a pixel array at a time, each of the plurality of areas including a plurality of pixels arranged in a 2n×2n matrix, where n is an integer equal to or greater than 2; generating first image data by performing analog-to-digital conversion on the plurality of pixel signals; generating, based on the first image data, a first summation value of each of a plurality of binning areas based on two pixel values corresponding to a same color in each of the plurality of binning areas, the plurality of binning areas corresponding to the plurality of areas of the pixel array; and generating a second summation value of each of two binning areas based on two first summation values corresponding to a same color in the two binning areas, the two binning areas being adjacent to each other in a column direction among the plurality of binning areas.

17 Claims, 16 Drawing Sheets

IMAGE SENSOR AND BINNING METHOD THEREOF

CROSS-REFERENCE TO RELATED APPLICATION

This application is based on and claims priority under 35 U.S.C. § 119 to Korean Patent Application No. 10-2020-0078813, filed on Jun. 26, 2020, in the Korean Intellectual Property Office, the disclosure of which is incorporated by reference herein in its entirety.

BACKGROUND

Example embodiments of the present disclosure relate to an image sensor, and more particularly, to a binning method of an image sensor and an image sensor for performing the method.

With the increase in resolution of an image sensor, the size of image data generated by the image sensor also increases. However, as the size of image data generated by an image sensor increases, it is hard to maintain a high frame rate in a video mode, and power consumption increases. For example, the frame rate may be an achievable frame rate based on circuit interface bandwidth and computational bandwidth related to avoiding artifacts such as zigzag artifact or false color when changing sample rate. When a number of required computations is high for avoiding artifacts and/or a circuit interface bandwidth is not high, the achievable frame rate is limited and this is a problem. A binning technique is used to increase a frame rate and maintain image quality.

SUMMARY

Example embodiments provide a binning method of an image sensor, by which a frame rate is increased, a data size is decreased, and image quality is maintained, and an image sensor for performing the method.

According to an aspect of an example embodiment, there is provided a binning method of an image sensor. The binning method includes reading out a plurality of pixel signals from at least two rows of each of a plurality of areas of a pixel array at a time, each of the plurality of areas including a plurality of pixels arranged in a 2n×2n matrix, where n is an integer equal to or greater than 2; generating first image data by performing analog-to-digital conversion on the plurality of pixel signals; generating, based on the first image data, a first summation value of each of a plurality of binning areas based on two pixel values corresponding to a same color in each of the plurality of binning areas, the plurality of binning areas corresponding to the plurality of areas of the pixel array; and generating a second summation value of each of two binning areas based on two first summation values corresponding to a same color in the two binning areas, the two binning areas being adjacent to each other in a column direction among the plurality of binning areas.

According to an aspect of an example embodiment, there is provided an image sensor including a pixel array divided into a plurality of areas having a quadrangular shape, each of the plurality of areas including pixels arranged in a 2n×2n matrix, where n is an integer equal to or greater than 2; an analog-to-digital conversion circuit configured to read out a plurality of pixel signals and convert the plurality of pixel signals into first image data, the first image data comprising a plurality of pixel values, the plurality of pixel signals being received from the pixel array through a plurality of column lines; a row driver configured to provide control signals through a plurality of row lines connected to the pixel array, the control signals configured to control pixel signals of at least two rows of the pixel array to be simultaneously output; a line buffer configured to store the first image data in certain line units; and a processor configured to perform binning on the first image data stored in the line buffer.

According to an aspect of an example embodiment, there is provided an image processing system including an image sensor configured to sense an optical signal and generate image data and a first processor configured to receive and process the image data from the image sensor, wherein the image sensor includes a pixel array divided into a plurality of areas having a quadrangular shape, each of the plurality of areas including pixels arranged in a 4×4 matrix; an analog-to-digital conversion circuit configured to read out a plurality of pixel signals and convert the plurality of pixel signals into first image data, the first image data comprising a plurality of pixel values, the plurality of pixel signals being received from the pixel array through a plurality of column lines; a row driver configured to provide control signals through a plurality of row lines connected to the pixel array, the control signals configured to control pixel signals of at least two rows of the pixel array to be simultaneously output; a line buffer configured to store the first image data in certain line units; and a second processor configured to perform binning on the first image data stored in the line buffer.

BRIEF DESCRIPTION OF THE DRAWINGS

Embodiments will be more clearly understood from the following detailed description taken in conjunction with the accompanying drawings in which.

DETAILED DESCRIPTION

Hereinafter, embodiments will be described in detail with reference to the accompanying drawings.

Figure 1:
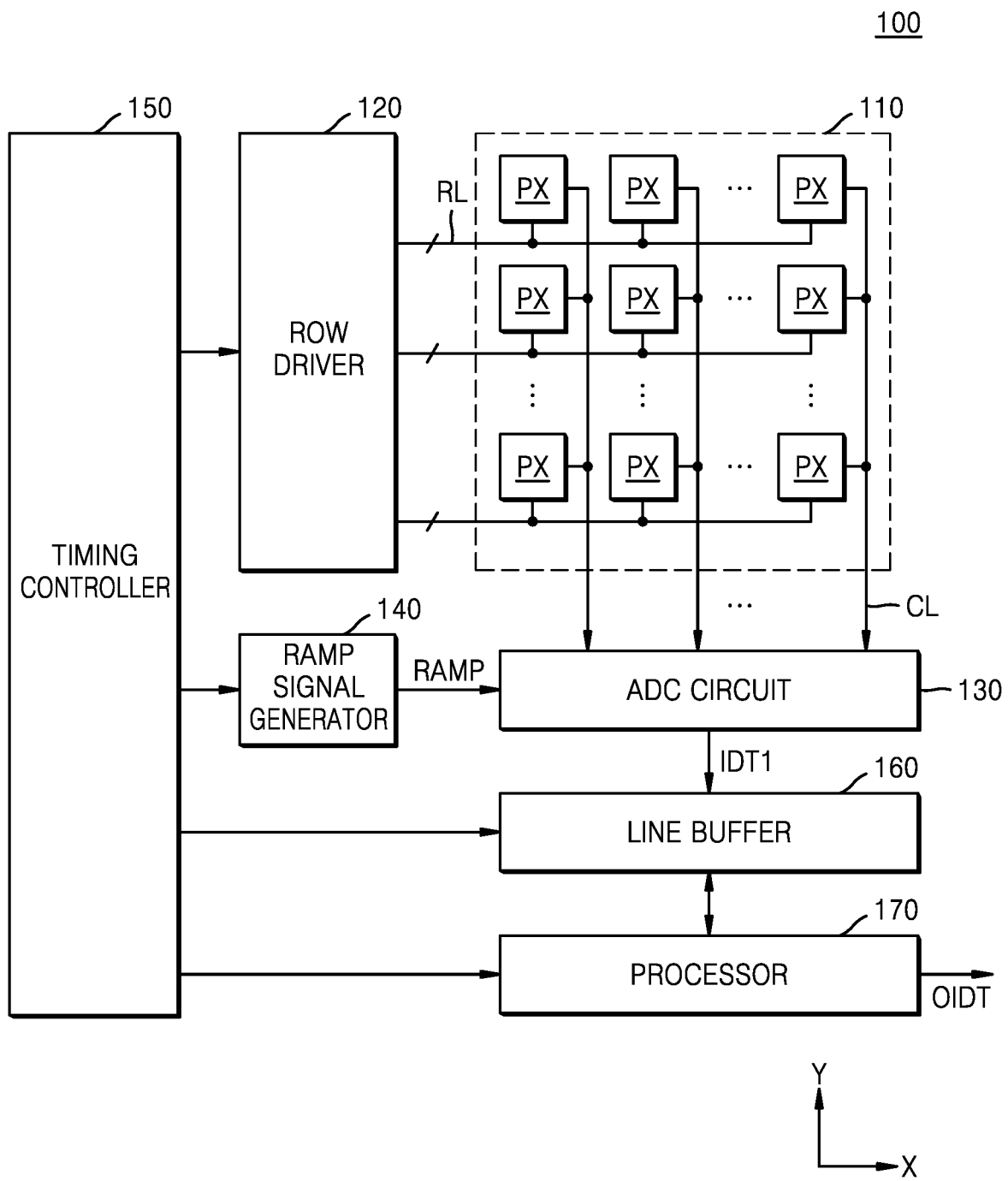
FIG. 1 is a schematic block diagram of an image sensor according to an example embodiment.

FIG. 1 is a schematic block diagram of an image sensor according to an example embodiment.

An image sensor 100 may be mounted on an electronic device having an image or optical sensing function. For example, the image sensor 100 may be mounted on an electronic device, such as a camera, a smartphone, a wearable device, an Internet of things (IoT) device, an appliance, a tablet personal computer (PC), a personal digital assistant (PDA), a portable multimedia player (PMP), a navigation device, a drone, or an advanced drivers assistance system (ADAS). The image sensor 100 may also be mounted on electronic devices that are used as components of vehicles, furniture, manufacturing facilities, doors, or various kinds of measuring equipment.

Referring to FIG. 1, the image sensor 100 may include a pixel array 110, a row driver 120, an analog-to-digital converter (ADC) circuit 130, a ramp signal generator 140, a timing controller 150, a line buffer 160, and a processor 170.

The pixel array 110 may include a plurality of pixels PX in a matrix and a plurality of row lines RL and column lines CL, which are connected to the pixels PX.

Each of the pixels PX may include at least one photoelectric conversion element (or photosensitive device). The photoelectric conversion element may sense light and convert the light into photocharge. For example, the photoelectric conversion element may include a photosensitive device, such as an inorganic photodiode, an organic photodiode, a Perovskite photodiode, a photo transistor, a photogate, or a pinned photodiode, which includes an organic or inorganic material. In an embodiment, each of the pixels PX may include a plurality of photoelectric conversion elements. A plurality of photosensitive devices may be arranged in the same layer or stacked on each other in a vertical direction.

A microlens for light gathering may be provided above each of the pixels PX or above a pixel group including adjacent pixels PX. Each of the pixels PX may sense light in a particular spectrum from light received through the microlens. For example, the pixel array 110 may include a red pixel converting light in a red spectrum into an electrical signal, a green pixel converting light in a green spectrum into an electrical signal, and a blue pixel converting light in a blue spectrum into an electrical signal. A color filter transmitting light in a particular spectrum may be provided above each of the pixels PX. However, embodiments are not limited thereto, and the pixel array 110 may include pixels converting light in other spectra than the red, green, and blue spectra.

In an embodiment, the pixels PX may have a multi-layer structure. Each of the pixels PX having the multi-layer structure may include stacked photosensitive devices each converting light in a different spectrum into an electrical signal so that electrical signals corresponding to different colors may be generated from the photosensitive devices. In other words, electrical signals corresponding to different colors may be output from a single pixel PX.

The pixel array 110 may have a Bayer pattern in which a first pixel, a second pixel, and a third pixel sense signals of different colors and are repeatedly arranged in column and row directions.

Figure 2:
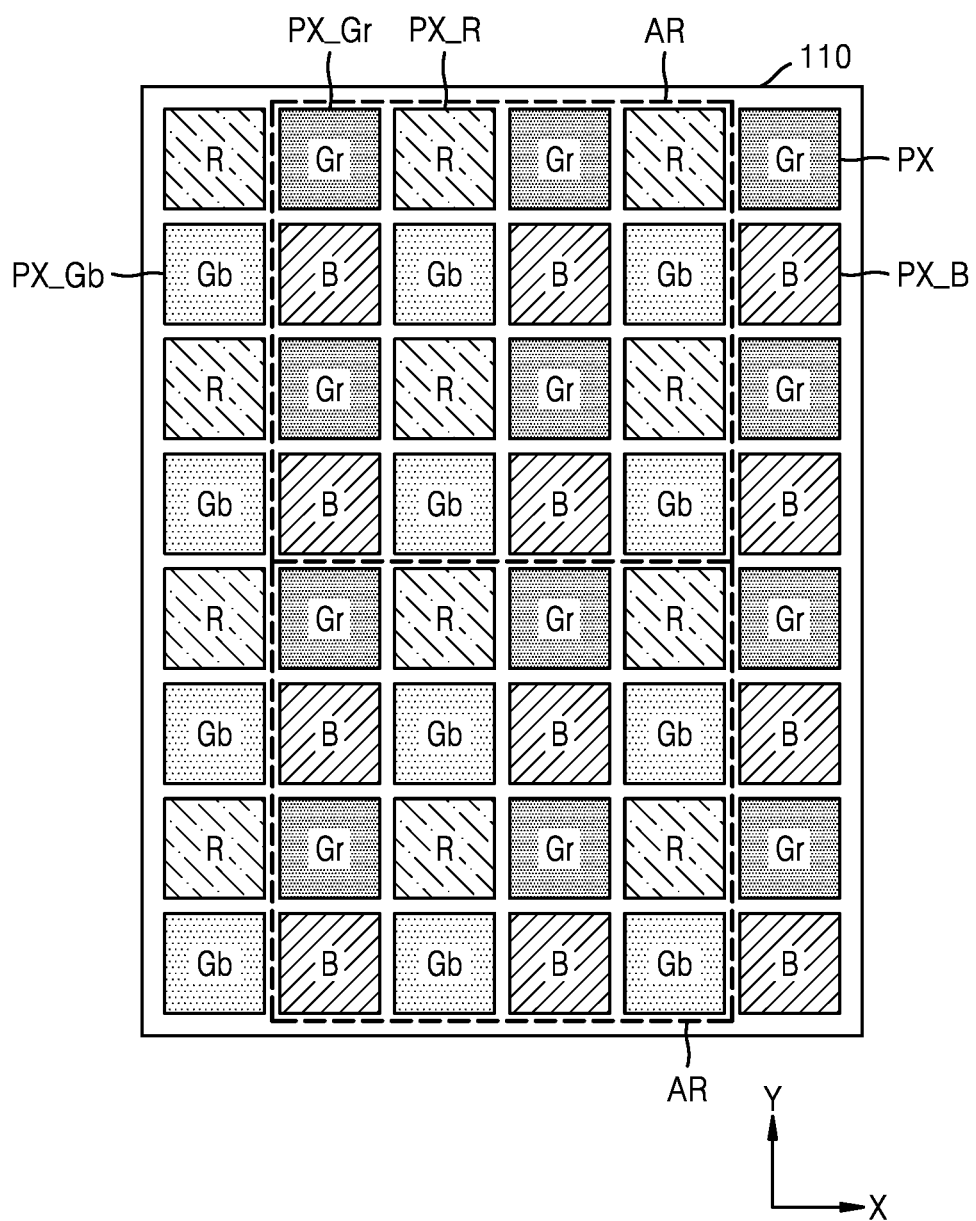
FIG. 2 illustrates an example of the pattern of a pixel array in FIG. 1.

FIG. 2 illustrates an example of the pattern of the pixel array 110 in FIG. 1.

Referring to FIG. 2, the pixel array 110 may include a plurality of pixels PX arranged in a row direction (e.g. an X-axis direction) and a column direction (e.g. an Y-axis direction) and the plurality of pixels PX may include red pixels PX_R, green pixels PX_Gr and PX_Gb, and blue pixels PX_B. In the pixel array 110, rows including a red pixel PX_R and a green pixel, e.g., a first green pixel PX_Gr, alternate with rows including another green pixel, e.g., a second green pixel PX_Gb, and a blue pixel PX_B; and green pixels, e.g., the first green pixel PX_Gr and the second green pixel PX_Gb, may be in a diagonal line. A green pixel, e.g., the first green pixel PX_Gr or the second green pixel PX_Gb, is closely related to luminance and thus arranged in every row; and the red pixel PX_R and the blue pixel PX_B are alternately arranged in different rows.

This pattern may be referred to as an RGB Bayer pattern. Hereinafter, it is assumed that the pixel array 110 has the RGB Bayer pattern. However, embodiments are not limited thereto. Various patterns having a structure, in which at least three colors of pixels are repeatedly arranged and a second pixel, e.g., a pixel related to luminance, is arranged in every row and forms a diagonal line with another second pixel of an adjacent row, may be applied to the pixel array 110. For example, an RYYB pattern including a red pixel, two yellow pixels, and a blue pixel may be applied to the pixel array 110.

The pixel array 110 may be divided into a plurality of areas AR. Each of the areas AR may include pixels PX in a 2n×2n matrix, where "n" is an integer of at least 2. For example, each of the areas AR may include pixels PX in a 4×4 matrix. At this time, each of the areas AR is a basic unit to which a readout method is applied when the image sensor 100 operates in a first mode performing binning, according to an embodiment. The areas AR may respectively correspond to a plurality of binning areas of image data generated based on readout signals. According to a readout method of an example embodiment, a plurality of pixel signals of at least two rows in each of the areas AR may be read out at a time. For example, a plurality of pixel signals of pixels of at least two rows may be read out in a single horizontal period. A readout method of an example embodiment will be described with reference to FIGS. 4A through 5B.

When the image sensor 100 operates in a second mode, e.g., a normal mode not performing binning, the pixel array 110 may sequentially readout pixel signals row by row.

Referring back to FIG. 1, each of the row lines RL may extend in a row direction and may be connected to pixels PX of one row. For example, each of the row lines RL may transmit control signals from the row driver 120 to a plurality of elements, e.g., transistors, included in each pixel PX.

Each of the column lines CL may extend in a column direction and may be connected to pixels PX of one column. Each of the column lines CL may transmit pixel signals, e.g., a reset signal and a sensing signal, from pixels PX of each row of the pixel array 110 to the ADC circuit 130. When the image sensor 100 operates in the first mode, as described above, some of the column lines CL may transmit pixel signals of at least two rows at a time.

The timing controller 150 may control the timings of other elements, e.g., the row driver 120, the ADC circuit 130, the ramp signal generator 140, the line buffer 160, and the processor 170, of the image sensor 100. The timing controller 150 may provide a timing signal indicating an operation timing to each of the row driver 120, the ADC circuit 130, the ramp signal generator 140, the line buffer 160, and the processor 170.

Under the control of the timing controller 150, the row driver 120 may generate control signals for driving the pixel array 110 and provide the control signals to the pixels PX of the pixel array 110 through the row lines RL. The row driver 120 may control a plurality of pixels of the pixel array 110 to sense incident light simultaneously or row by row. The row driver 120 may select pixels PX of a row or at least two rows and may control the selected pixels PX to output pixel signals through the column lines CL.

The ramp signal generator 140 may generate a ramp signal RAMP, which increases or decreases with a certain slope, and provide the ramp signal RAMP to the ADC circuit 130.

The ADC circuit 130 may receive pixel signals, which are read out from pixels PX of a row selected by the row driver 120 among a plurality of pixels PX of the pixel array 110, and convert the pixel signals into pixel values corresponding to digital data.

The ADC circuit 130 may generate and output first image data IDT1, e.g., raw image data, in row units by converting pixel signals, which are received from the pixel array 110 through the column lines CL, into digital data based on the ramp signal RAMP from the ramp signal generator 140.

The ADC circuit 130 may include a plurality of ADCs respectively corresponding to the column lines CL. Each of the ADCs may compare a pixel signal received through a corresponding one of the column lines CL with the ramp signal RAMP and may generate a pixel value based on a comparison result. For example, an ADC may remove a reset signal from a sensing signal using correlated double sampling (CDS) and generate a pixel value indicating the amount of light sensed by a pixel PX.

The line buffer 160 may include a plurality of line memories and store a plurality of pixel values output from the ADC circuit 130 in certain row units. In other words, the line buffer 160 may store the first image data IDT1 output from the ADC circuit 130 in certain row units. For example, the line buffer 160 may include three line memories respectively corresponding to three rows of the pixel array 110 and store a plurality of pixel values, which correspond to three rows of the first image data IDT1 output from the ADC circuit 130, in the three line memories.

The processor 170 may process a plurality of pixel values corresponding to a plurality of rows of the first image data IDT1 stored in the line buffer 160. The processor 170 may perform image quality compensation, binning, downsizing, or the like on the first image data IDT1 in certain row units stored in the line buffer 160. Accordingly, output image data OIDT resulting from image processing may be generated and output in certain row units.

In an embodiment, the processor 170 may process the first image data IDT1 by colors. For example, when the first image data IDT1 includes red, green, and blue pixel values, the processor 170 may process the red, green, and blue pixel values in parallel or in series. In an embodiment, the processor 170 may include a plurality of processing circuits to process different colors in parallel. However, embodiments are not limited thereto, and a single processing circuit may be used repeatedly.

The processor 170 may generate the output image data OIDT having a data size reduced by performing a binning method according to an example embodiment described below.

The output image data OIDT may be output to an external processor, e.g., an application processor. The application processor may store, perform image processing on, or display the output image data OIDT. See FIGS. 13 and 14, described below.

According to an example embodiment, when the image sensor 100 operates in a first operation mode, a plurality of pixel signals of at least two rows may be simultaneously read out and may undergo analog summation in a vertical direction (e.g., the column direction). According to the analog vertical summation, at least two rows are simultaneously read out during a single horizontal period so that a frame rate may increase at least twofold.

The first image data IDT1 may be generated according to the analog vertical summation, and the processor 170 may perform binning to generate the output image data OIDT. Accordingly, the size of the output image data OIDT may be reduced, and the occurrence of zigzag noise and false color caused by a sampling frequency difference may decrease, thus providing good image quality and high frame rate.

Figure 3A:
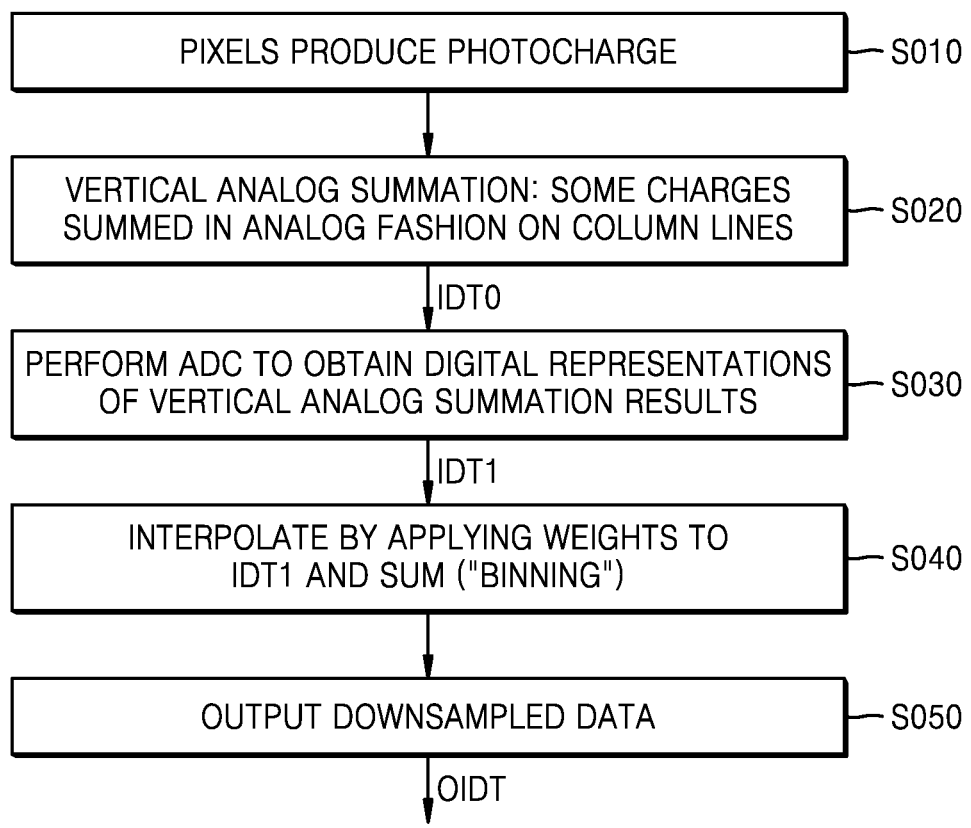
FIG. 3A is a flowchart illustrating vertical analog summation and also interpolation of an image sensor, according to an example embodiment.

FIG. 3A is a flowchart illustrating vertical analog summation and also interpolation of an image sensor, according to an example embodiment. The binning method of FIG. 3A may be performed by the image sensor 100 of FIG. 1.

At operation S010, pixels produce photocharge. For further details see the discussion of FIG. 12 below.

At operation S020, photocharges are summed in analog fashion on column wires. For example, photocharges may be summed on the column lines CL of FIG. 1. The result is labelled as IDT0 in FIG. 3A. Also see FIG. 12.

At operation S030, analog to digital conversion ("ADC") of voltages resulting from the charge summation are converted to digital values. These digital values, produced by, for example, ADC circuit 130 of FIG. 1, form the image IDT1 of FIG. 1. See, for example, FIG. 4B and discussion below.

At operation S040, pixels from IDT1 are interpolated using weights. See for example FIG. 6 and discussion below.

At operation S050, the resulting interpolated digital values are output as output image data OIDT of FIG. 1, for example.

Figure 3B:
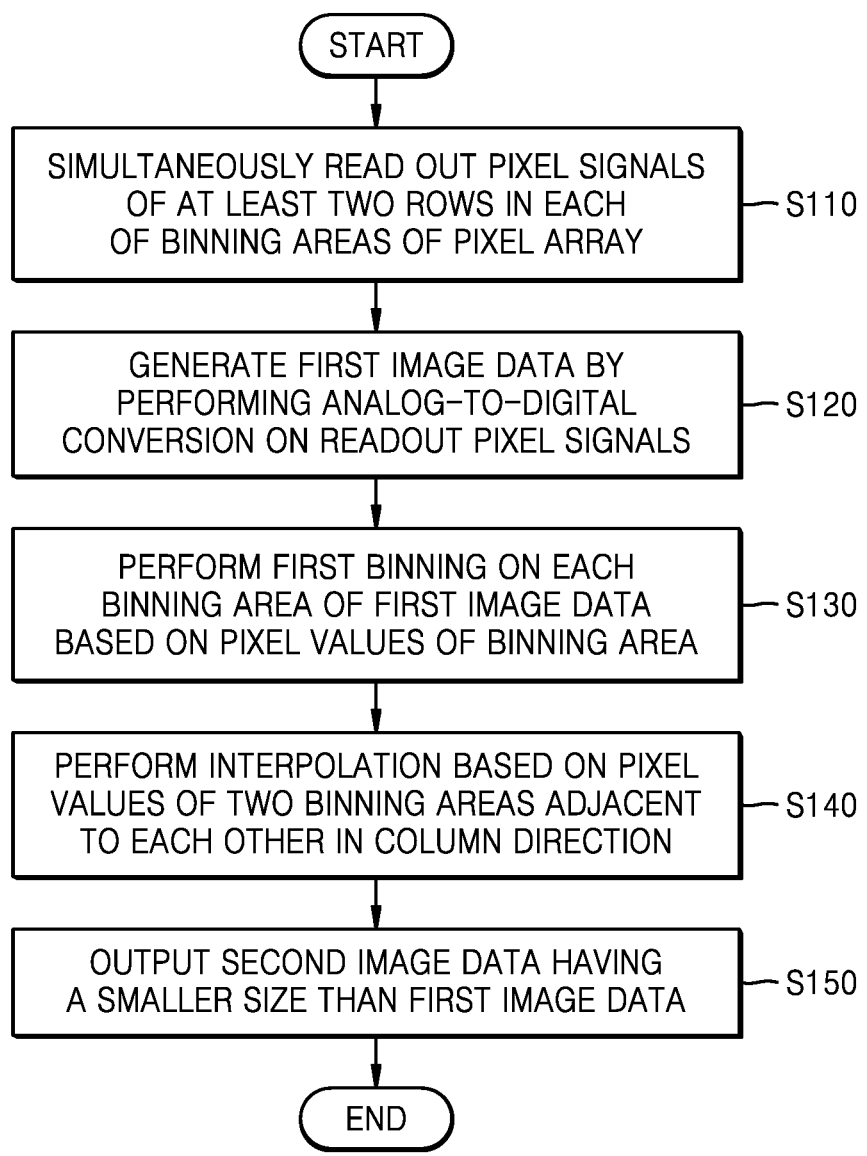
FIG. 3B is a flowchart of a binning method of an image sensor, according to an example embodiment.

FIG. 3B is a flowchart of a binning method of an image sensor, according to an example embodiment. The binning method of FIG. 3B may be performed by the image sensor 100 of FIG. 1.

Referring to FIGS. 1 through 3B, the image sensor 100 may simultaneously read out a plurality of pixel signals of at least two rows in each of the areas AR of the pixel array 110 in operation S110. Accordingly, as described above, at least two pixel signals output from at least two pixels in at least two rows and in one column may undergo analog summation.

The image sensor 100 may generate the first image data IDT1 by performing analog-to-digital conversion on the readout pixel signals in operation S120. For example, the ADC circuit 130 may generate the first image data IDT1 by performing analog-to-digital conversion on the pixel signals received through the column lines CL. Thereafter, digital binning may be performed.

The first image data IDT1 may be divided into a plurality of binning areas. The image sensor 100 may perform first binning on each of the binning areas of the first image data IDT1 based on pixel values of each binning area in operation S130. The image sensor 100 may perform weighted summation on pixel values having the same color in each binning area. In the present disclosure, weighted summation indicates that a set weight may be applied to each of the pixel values, and weighted values may be summed (or summed and averaged).

The image sensor 100 may perform interpolation based on pixel values of two binning areas adjacent to each other in the column direction in operation S140. The image sensor 100 may perform weighted summation on pixel values having the same color in the two binning areas.

Accordingly, second image data having a smaller size than the first image data IDT1 may be output in operation S150. For example, when each binning area includes pixel values in a 4×4 matrix, the size of the second image data may correspond to ¼ of the resolution of the pixel array 110.

A binning method according to an example embodiment will be described in detail with reference to FIGS. 4A through 9 below.

Figure 4A:
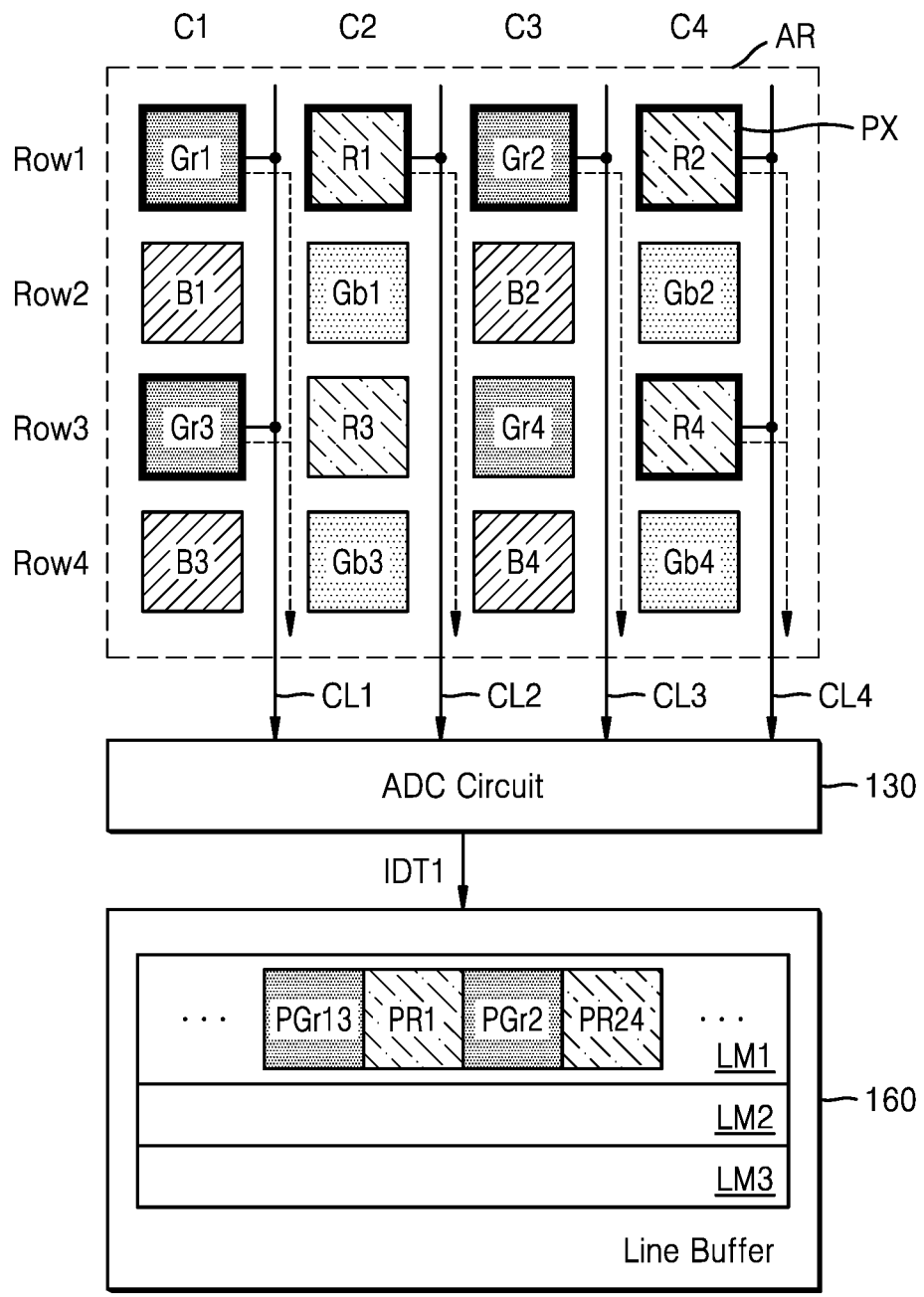
FIGS. 4A and 4B are diagrams for describing a readout method according to an example embodiment.
Figure 4B:
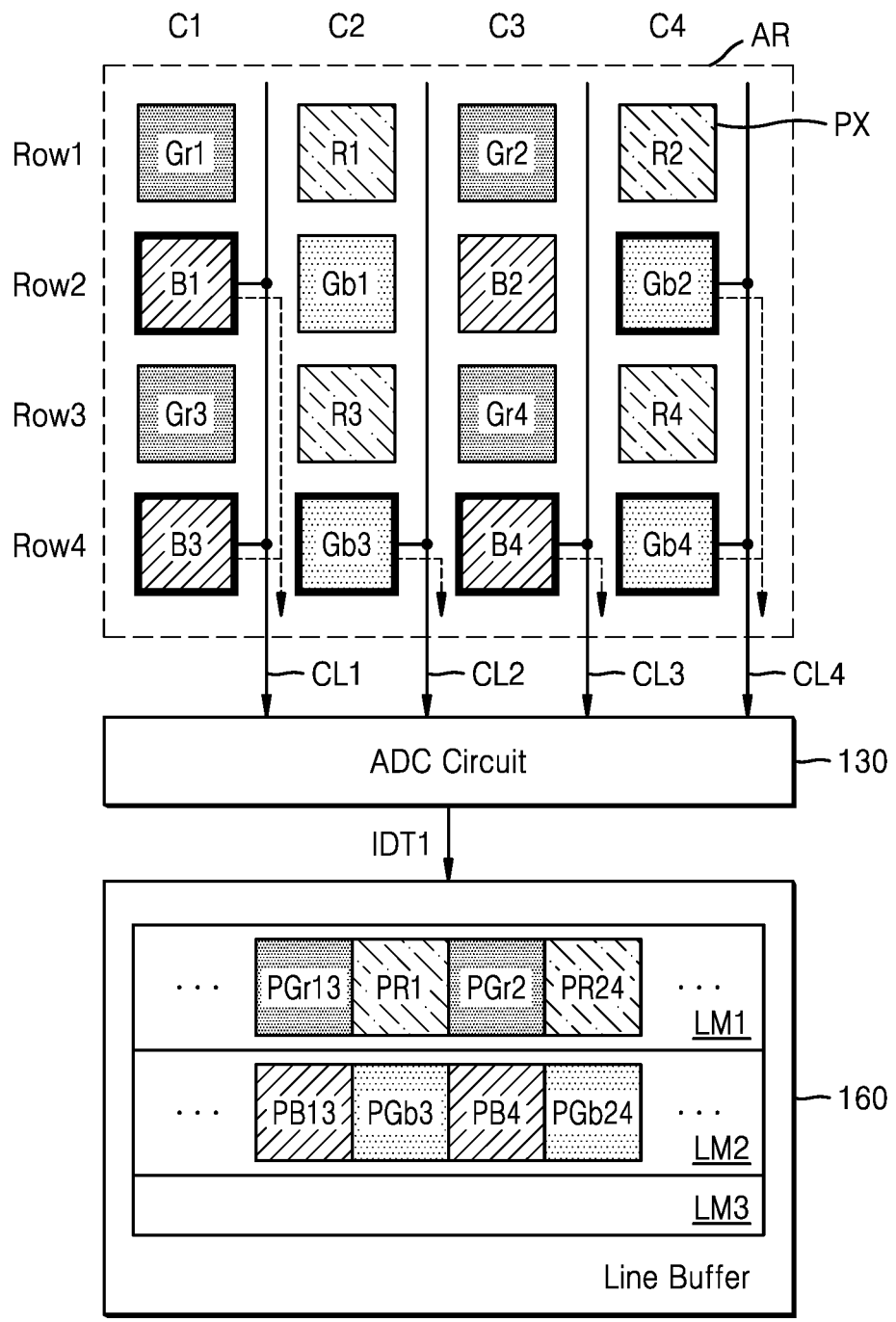
Figure 5A:
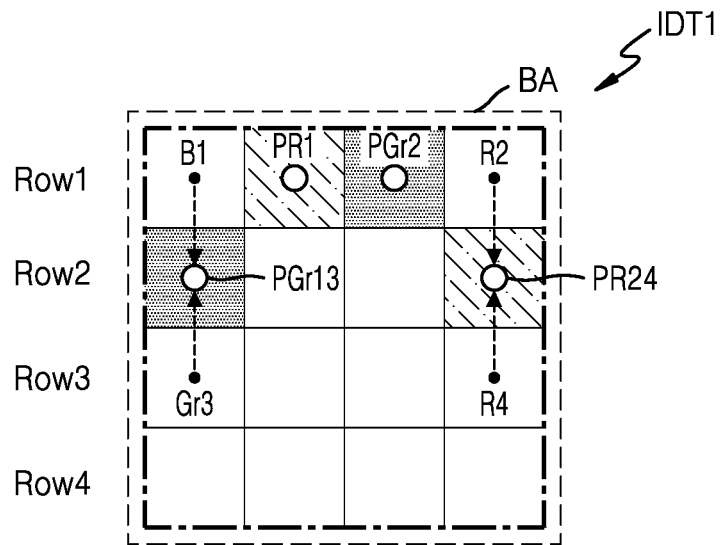
FIGS. 5A, 5B, and 5C are schematic diagrams of first image data, which is generated by a readout method, according to an example embodiment.
Figure 5B:
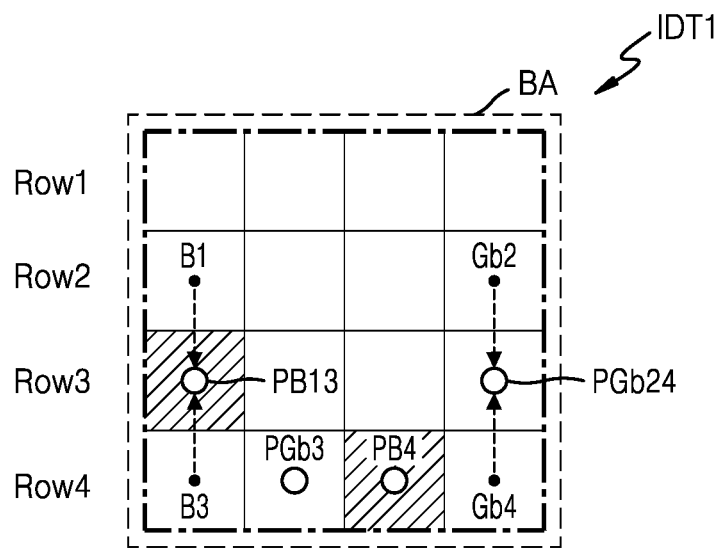
Figure 5C:
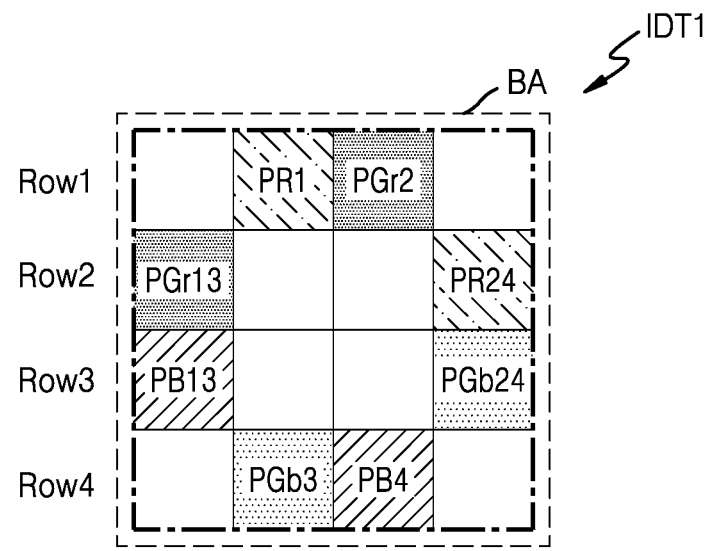

FIGS. 4A and 4B are diagrams for describing a readout method according to an example embodiment. FIGS. 5A through 5C are schematic diagrams of first image data, which is generated by a readout method, according to an example embodiment.

FIGS. 4A and 4B show a readout of an area AR of the pixel array 110. The area AR may include a plurality of pixels PX in a 4×4 matrix.

Referring to FIG. 4A, a first row Row1 and a third row Row3 may be simultaneously read out during a first horizontal period. Pixel signals of first green pixels Gr1 and Gr3 in a first column C1 may be output through a first column line CL1, and pixel signals of red pixels R2 and R4 in a fourth column C4 may be output through a fourth column line CL4.

When the pixel signals of two pixels, e.g., the first green pixels Gr1 and Gr3, are output through the first column line CL1, the pixel signals may be summed. However, when a pixel signal is output from a pixel PX, the pixel PX may operate as a source follower. Because of parasitic resistance of the pixel PX, the pixel signal having a higher value between the pixel signals of the first green pixels Gr1 and Gr3 may be provided, as a summation signal corresponding to the first green pixels Gr1 and Gr3, to the ADC circuit 130 through the first column line CL1.

Among red pixels R1 and R3 in a second column C2, a pixel signal of the red pixel R1 in an outer region of the area AR may be output through a second column line CL2. Among first green pixels Gr2 and Gr4 in a third column C3, a pixel signal of the first green pixel Gr2 in an outer region of the area AR may be output through a third column line CL3. In other words, in each of the second and third columns C2 and C3, a pixel signal of a pixel in a relatively outer region among pixels having the same color in the first and third rows Row1 and Row3 may be read out. Pixel signals of pixels in a relatively inner region may not be read out.

The ADC circuit 130 may convert the pixel signals into digital values, e.g., pixel values PGr13, PR1, PGr2, and PR24. In an embodiment, the pixel values PGr13, PR1, PGr2, and PR24 generated during the first horizontal period may be stored in one line memory, e.g., a first line memory LM1 of the line buffer 160, and may form a portion of the first image data IDT1. However, the pixel values PGr13, PR1, PGr2, and PR24 may not correspond to the same row of the first image data IDT1.

Referring to FIG. 4B, a second row Row2 and a fourth row Row4 may be simultaneously read out during a second horizontal period following the first horizontal period. Pixel signals of blue pixels B1 and B3 in the first column C1 may be output through the first column line CL1, and pixel signals of second green pixels Gb2 and Gb4 in the fourth column C4 may be output through the fourth column line CL4. At this time, as described above with reference to FIG. 4A, two pixel signals output through the same column line may be summed, and a summation signal may be provided to the ADC circuit 130.

Among second green pixels Gb1 and Gb3 in the second column C2, a pixel signal of the second green pixel Gb3 in an outer region of the area AR may be output through the second column line CL2. Among blue pixels B2 and B4 in the third column C3, a pixel signal of the blue pixel B4 in an outer region of the area AR may be output through the third column line CL3.

The ADC circuit 130 may convert the pixel signals into digital values, e.g., pixel values PB13, PGb3, PB4, and PGb24. In an embodiment, the pixel values PB13, PGb3, PB4, and PGb24 generated during the second horizontal period may be stored in one line memory, e.g., a second line memory LM2 of the line buffer 160, and may form a portion of the first image data IDT1. In an embodiment, the pixel values PGr13, PR1, PGr2, and PR24 generated during the first horizontal period may move from the first line memory LM1 to the second line memory LM2, and the pixel values PB13, PGb3, PB4, and PGb24 generated during the second horizontal period may be stored in the first line memory LM1. The line buffer 160 may also include a third line buffer, LM3, which is used in a successive manner to LM2 and LM1, similarly to the discussion of LM1 and LM2 above.

Referring to FIG. 5A, the pixel values PGr13, PR1, PGr2, and PR24 stored in the first line memory LM1 may form the first row Row1 and the second row Row2 in a binning area BA of the first image data IDT1. Each of the pixel values PGr13 and PR24 is the sum (or, the average value) of pixel signals of two pixels (e.g., the first green pixels Gr1 and Gr3 or the red pixels R2 and R4 in FIG. 4A) respectively in the first and third rows Row1 and Row3 of the area AR of the pixel array 110 and may thus represent a pixel value of a sampling position corresponding to a middle point between the two pixels. The pixel values PR1 and PGr2 may respectively represent pixel values at the positions of the corresponding pixels, i.e., the red pixel R1 and the first green pixel Gr2 in FIG. 4A.

Referring to FIG. 5B, the pixel values PB13, PGb3, PB4, and PGb24 stored in the second line memory LM2 may form the third row Row3 and the fourth row Row4 in the binning area BA of the first image data IDT1. Each of the pixel values PB13 and PGb24 is the sum (or the average value) of pixel signals of two pixels (e.g., the blue pixels B1 and B3 or the second green pixels Gb2 and Gb4 in FIG. 4B) respectively in the second and fourth rows Row2 and Row4 of the area AR of the pixel array 110 and may thus represent a pixel value of a sampling position corresponding to a middle point between the two pixels. The pixel values PGb3 and PB4 may respectively represent pixel values at the positions of the corresponding pixels, i.e., the second green pixel Gb3 and the blue pixel B4 in FIG. 4B.

When the readout of the area AR of the pixel array 110 is performed according to an example embodiment, pixel values of the binning area BA of the first image data IDT1 may be determined, as shown in FIG. 5C.

Figure 6:
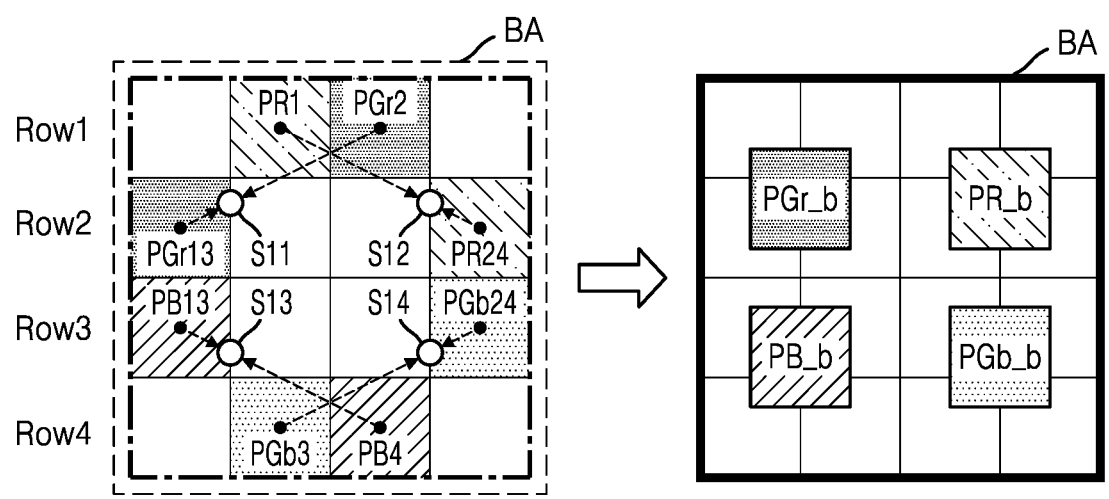
FIG. 6 illustrates first binning performed on each of a plurality of binning areas of first image data based on pixel values in each binning area in a binning method, according to an example embodiment.

FIG. 6 illustrates first binning performed on each of a plurality of binning areas of first image data based on pixel values in each binning area in a binning method, according to an example embodiment.

Referring to FIG. 6, the first binning may be performed by summing pixel values corresponding to the same color in the binning area BA.

For example, a pixel value corresponding to a sampling position S11 may be calculated by summing the pixel values PGr13 and PGr2 corresponding to a first green color. At this time, a preset weight may be applied to each of the pixel values PGr13 and PGr2, and weighted values may be summed. Weights may be preset taking into account sampling positions. In other words, the weights may be set such that the sum of weighted values is located at the sampling position S11. For example, when a distance between the centers of pixels represented by the pixel values PGr13 and PGr2 is 10 and the sampling position S11 is located at a distance of 3 from the pixel value PGr13, a ratio of weights respectively applied to the pixel values PGr13 and PGr2 may be 7:3. In other words, a higher weight may be applied to the pixel value PGr13.

In the same manner, weights may be applied to pixel values corresponding to the same color such that the color is located at a sampling position S12, S13, or S14, and weighted values may be summed. Consequently, pixel values PGr_b, PR_b, PB_b, and PGb_b respectively corresponding to the sampling positions S11, S12, S13, and S14 may be calculated.

Figure 7:
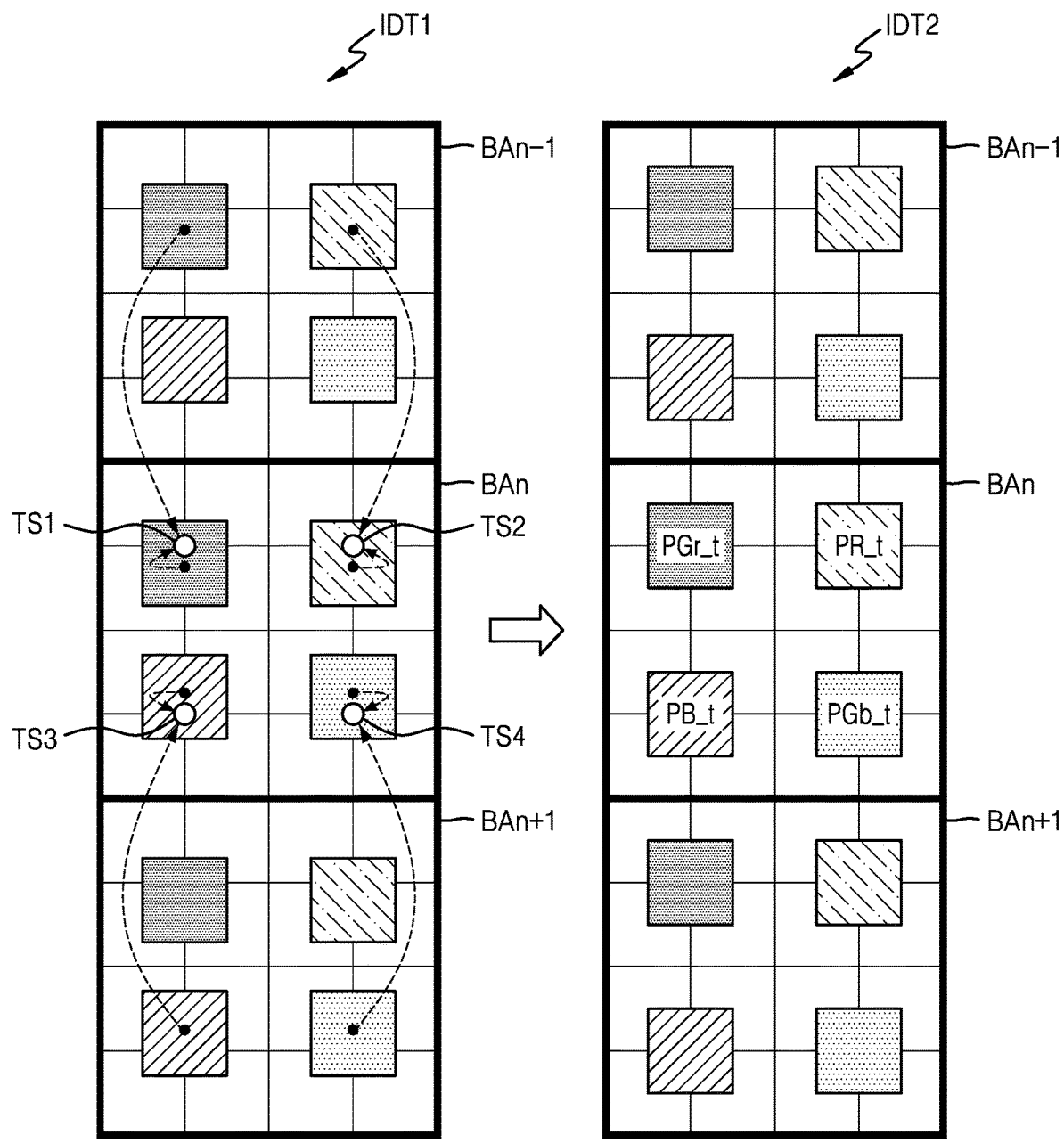
FIG. 7 illustrates an interpolation performed based on pixel values of two adjacent binning areas in a binning method, according to an example embodiment.

FIG. 7 illustrates an interpolation performed based on pixel values of two adjacent binning areas in a binning method, according to an example embodiment.

Referring to FIG. 7, the first image data IDT1 may include a plurality of binning areas BAn−1, BAn, and BAn+1. Interpolation may be performed on the binning areas BAn−1, BAn, and BAn+1 so that pixel values PGr_t, PR_t, PB_t, and PGb_t respectively corresponding to target sampling positions TS1, TS2, TS3, and TS4 may be generated.

Generating pixel values corresponding to target sampling positions in the binning area BAn will be exemplarily described. As described with reference to FIG. 6, the pixel values PGr_b, PR_b, PB_b, and PGb_b corresponding to the sampling positions S11, S12, S13, and S14 are calculated in the binning area BAn, and each of the pixel values PGr_b, PR_b, PB_b, and PGb_b may be added to a pixel value corresponding to a nearest pixel among pixel values of the same color in the adjacent binning areas BAn−1 and BAn+1. A weight may be applied to each of the pixel values. The weight may be set taking into account a position of each pixel value and a target sampling position. The less the distance between a position corresponding to a pixel value and a target sampling position, a weight may be greater. As described above, the pixel values PGr_t, PR_t, PB_t, and PGb_t respectively corresponding to the target sampling positions TS1, TS2, TS3, and TS4 in the binning area BAn may be calculated by interpolation.

Through analog vertical summation and binning of readouts from a plurality of pixels PX in a 4×4 matrix, second image data IDT2 including pixel values in a 2×2 matrix may be generated. See the right hand portion of FIG. 7.

Figure 8:
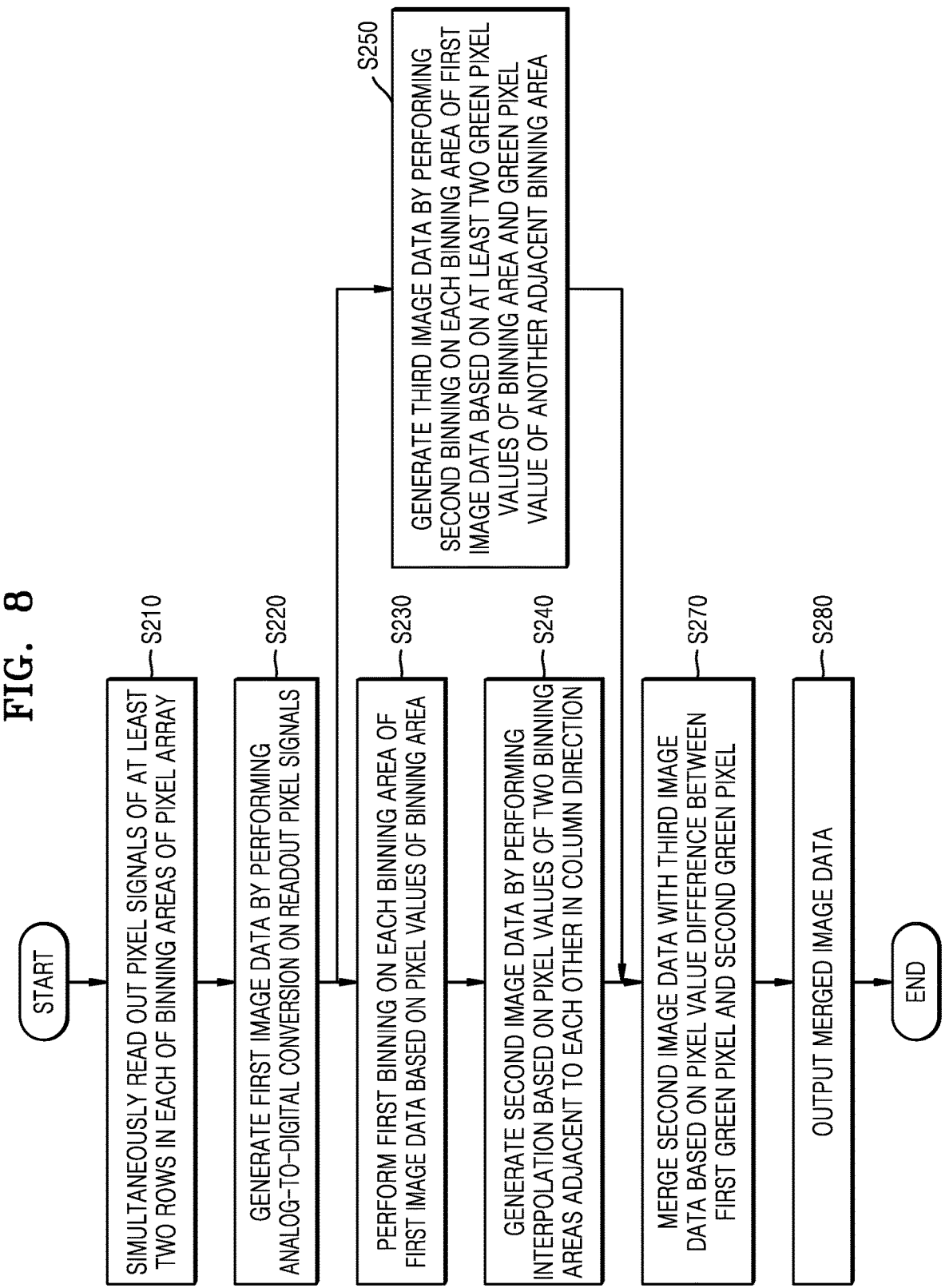
FIG. 8 is a flowchart of a binning method of an image sensor, according to an example embodiment.

FIG. 8 is a flowchart of a binning method of an image sensor, according to an example embodiment. The binning method of FIG. 8 may be performed by the image sensor 100 of FIG. 1. Operations S210, S220, S230, and S240 are the same as operations S110, S120, S130, and S140 in FIG. 3B. Thus, redundant descriptions will be omitted.

After the first image data IDT1 is generated in operation S220, the image sensor 100 may perform second binning on green pixels in operation S250. The image sensor 100 may sum at least two green pixel values in each of a plurality of binning areas of the first image data IDT1 and a green pixel value in an adjacent binning area. For example, the adjacent binning area may be adjacent to each binning area in the column direction. A weight may be applied to each pixel value taking into account a sampling position, and weighted values may be summed. The second binning will be described in detail with reference to FIG. 9.

Figure 9:
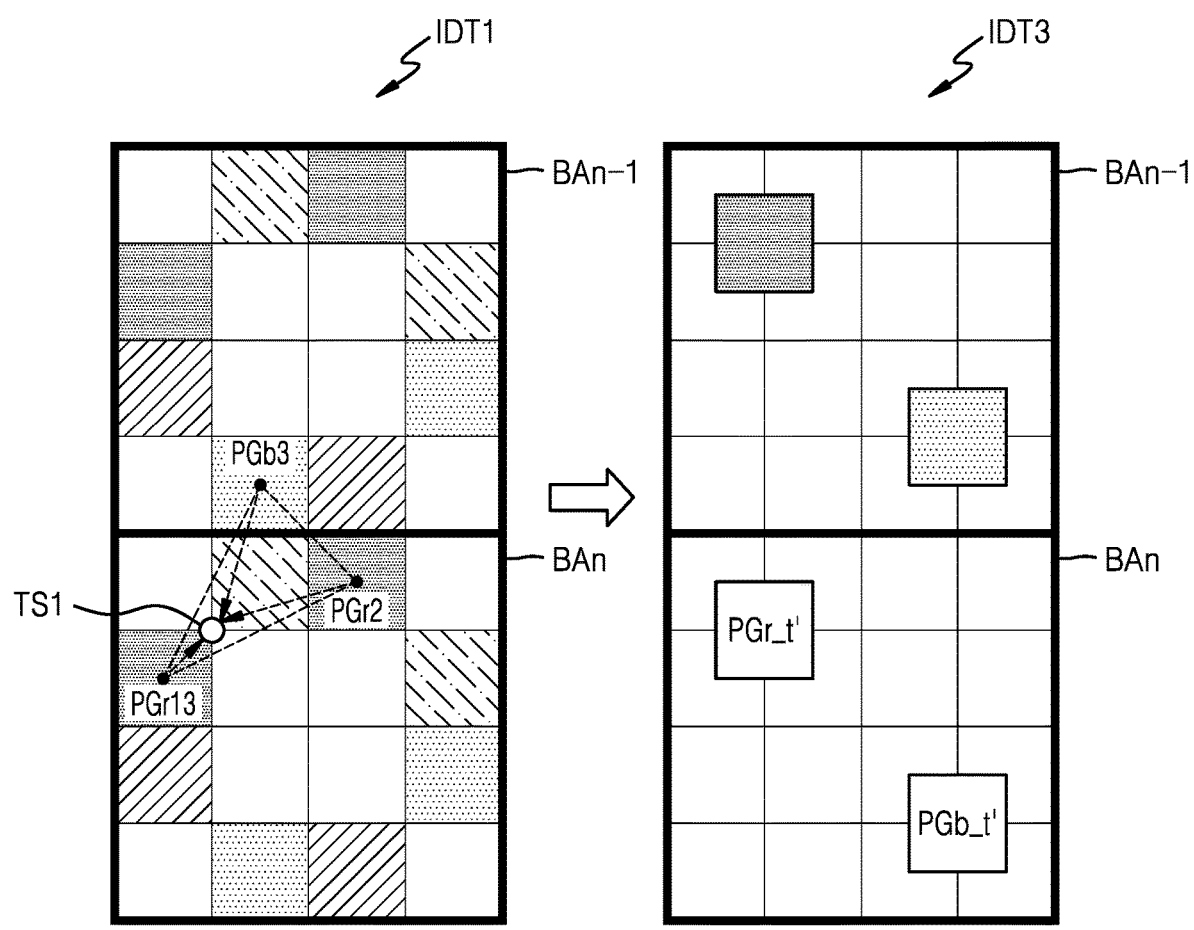
FIG. 9 is a diagram for describing second binning applied to a green pixel in a binning method, according to an example embodiment.

FIG. 9 is a diagram for describing second binning applied to a green pixel in a binning method, according to an example embodiment.

Referring to FIG. 9, the binning area BAn and the binning area BAn−1 may be most adjacent to each other in the column direction.

The pixel values PGr13 and PGr2 corresponding to first green pixels in the binning area BAn and the pixel value PGb3 corresponding to a second green pixel, which is most adjacent to the first green pixels in the binning area BAn, in the binning area BAn−1 may be summed. At this time, a weight may be applied to each of the pixel values PGr13, PGr2, and PGb3 such that a summation value is located at the first target sampling position TS1, and weighted values may be summed. Accordingly, a pixel value PGr_t' of a green pixel corresponding to the first target sampling position TS1 may be generated. In a similar manner, a pixel value PGb_t' of a green pixel corresponding to the second target sampling position TS2 may be generated. In this manner, pixel values of green pixels at target sampling positions corresponding to green pixels of the binning area BAn are determined, and accordingly, third image data IDT3 including the pixel values of green pixels may be generated.

During the interpolation performed in operation S240, pixel values to be summed are far away from each other, as shown in FIG. 7. However, according to the second binning, a pixel value of a green pixel, which is nearest to the binning area BAn and pixel values of green pixels in the binning area BAn may be summed. Therefore, binning may be performed based on pixel values corresponding to adjacent pixels.

Referring back to FIG. 8, the second image data and the third image data may be merged with each other based on a pixel value difference between a first green pixel and a second green pixel in operation S270. As described above, the third image data may include pixel values of green pixels. Accordingly, the pixel values of green pixels of the second image data may be merged with the pixel values of green pixels of the third image data. At operation S280, merged image data is output.

At this time, the second image data and the third image data may be merged with each other based on a difference between pixel values corresponding to two most adjacent pixels among the pixel values of first and second green pixels used during the second binning.

For example, when the difference between pixel values is less than a first reference value, that is, when the difference between pixel values is very small, the pixel values of green pixels of the third image data may be applied to output image data. In other words, the pixel values of red and blue pixels of the second image data and the pixel values of green pixels of the third image data may be included in the output image data. When the difference between pixel values exceeds a second reference value, that is, when the difference between pixel values is very large, the second image data may be selected as the output image data. In other words, the green pixel values of the third image data may not be reflected in the output image data.

The comparison of differences with thresholds provides a non-linear step which is useful to reduce artifacts such as zigzag artifact and false color artifact.

Otherwise, when the difference between pixel values is greater than or equal to the first reference value and less than the second reference value, the difference may be converted into a value less than or equal to 1 based on the first reference value and the second reference value, a weight may be applied to each of the second image data and the third image data based on the value resulting from the conversion, and weighted values may be summed. For example, when the difference between pixel values is converted into a value of 0.6, a weight of 0.4 may be applied to the pixel values of green pixels of the second image data and a weight of 0.6 may be applied to the pixel values of green pixels of the third image data, and weighted values may be summed. Based on summation pixel values for green pixels and the pixel values of red and blue pixels of the second image data, the output image data may be generated.

Figure 10:
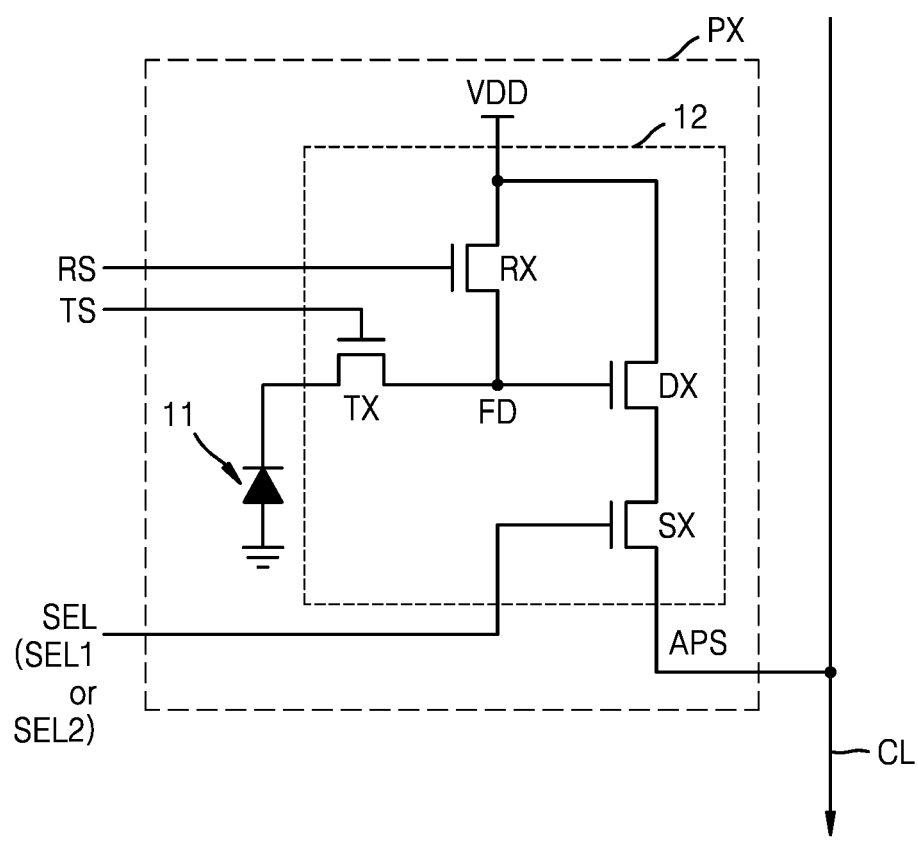
FIG. 10 illustrates an example of a pixel according to an example embodiment.

FIG. 10 illustrates an example of a pixel according to an example embodiment.

Referring to FIG. 10, a pixel PX may include a photoelectric conversion element 11 and a pixel circuit 12. The pixel circuit 12 may include a plurality of transistors, e.g., a transfer transistor TX controlled by a signal TS, a reset transistor RX, a drive transistor DX, and a select transistor SX The photoelectric conversion element 11 may include a photodiode. The photodiode may generate photocharge varying with the intensity of incident light. The transfer transistor TX may transfer the photocharge to a floating diffusion node FD according to a transfer control signal TS provided from the row driver 120 (in FIG. 1). The drive transistor DX may amplify a voltage corresponding to photocharge accumulated in the floating diffusion node FD. The drive transistor DX may operate as a source follower. When a drain node of the select transistor SX is connected to a source node of the drive transistor DX and the select transistor SX is turned on in response to a select signal SEL output from the row driver 120, a pixel signal APS corresponding to a voltage level of the floating diffusion node FD may be output to a column line CL connected to the pixel PX. The reset transistor RX may reset the floating diffusion node FD based on a supply voltage VDD in response to a reset signal RS provided from the row driver 120.

As described above with reference to FIGS. 4A and 4B, at least two rows of the pixel array 110 may be read out. At this time, pixels in a central portion of an area AR of the pixel array 110 are not read out. Accordingly, when two rows are simultaneously read out, the pixels in the central portion may not be selected. The pixels to be read out may be connected to the column line CL in response to a first select signal SEL1 at an active level, and the pixels not to be read out may be disconnected from the column line CL in response to a second select signal SEL2 at an inactive level. Accordingly, even though pixels are in the same row, a pixel signal of each pixel may selectively be output or not output.

Figure 11A:
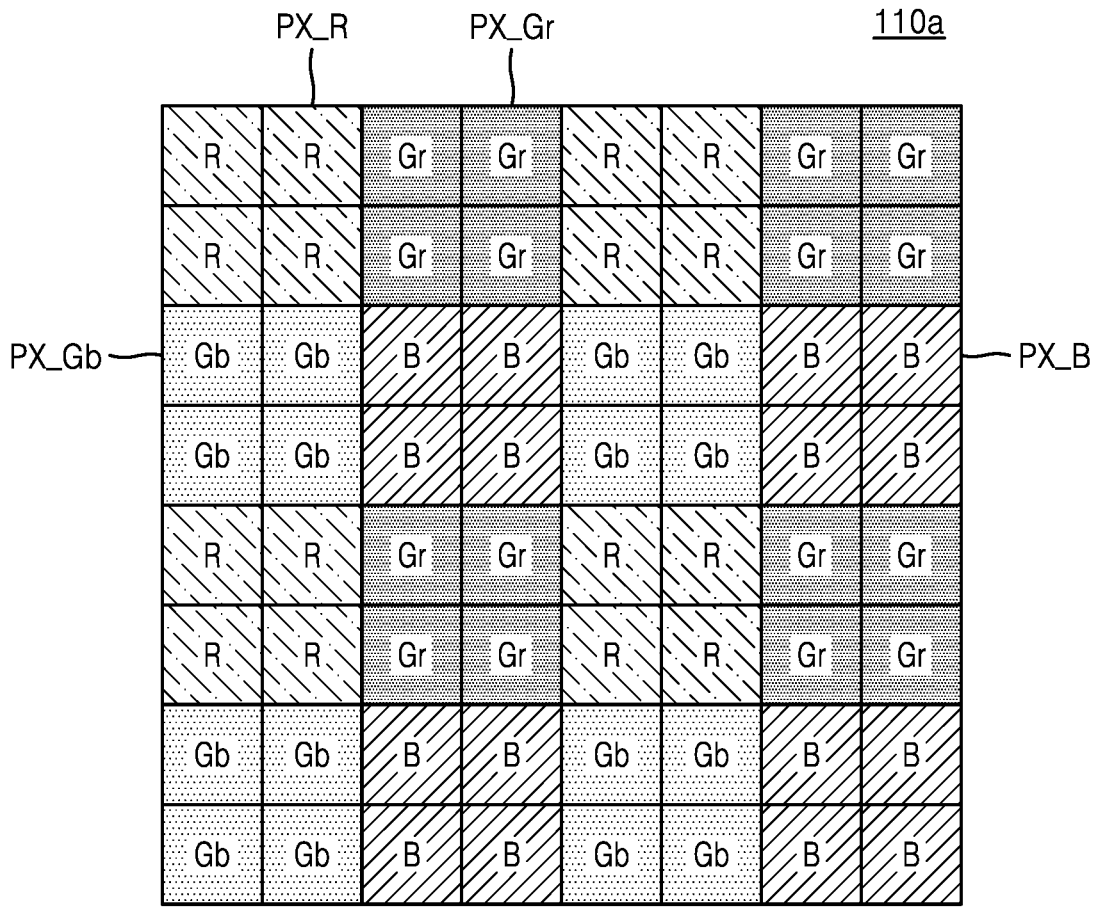
FIG. 11A illustrates a pixel array having a tetra pattern.
Figure 11B:
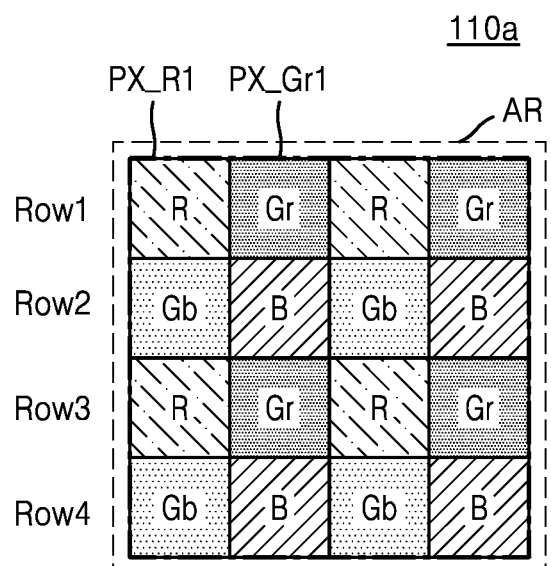
FIG. 11B illustrates an example of applying a pixel array having a tetra pattern to an image sensor, according to an example embodiment.

FIG. 11A illustrates a pixel array having a tetra pattern. FIG. 11B illustrates an example of applying a pixel array having a tetra pattern to an image sensor, according to an example embodiment.

Referring to FIG. 11A, a pixel array 110a has a tetra pattern. Red pixels PX_R may be arranged in a 2×2 matrix, first green pixels PX_Gr may be arranged in a 2×2 matrix, second green pixels PX_Gb may be arranged in a 2×2 matrix, and blue pixels PX_B may be arranged in a 2×2 matrix. This pattern may be repeated in a matrix. Such a pattern may be referred to as a Quad Bayer pattern.

Figure 12:
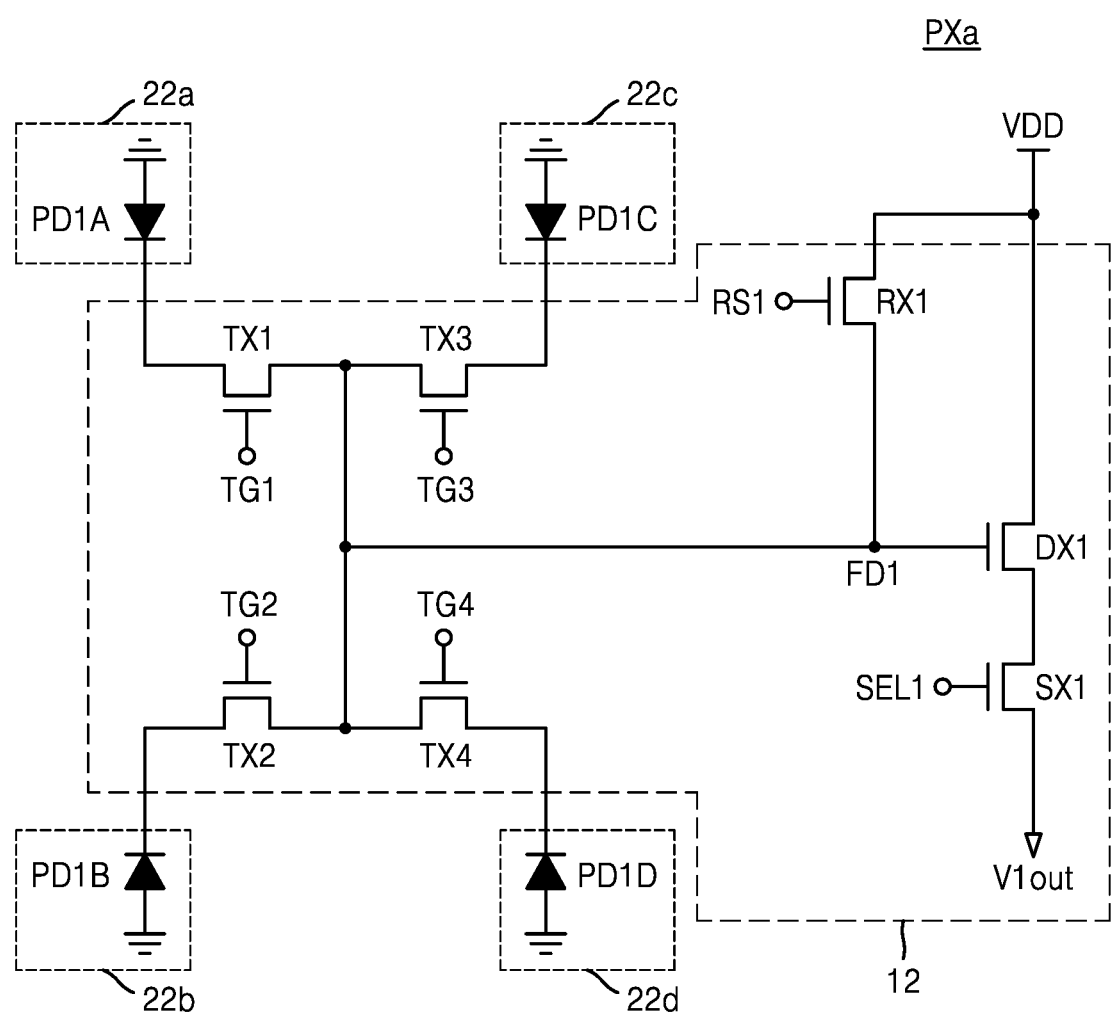
FIG. 12 illustrates an example of a pixel according to an example embodiment.

In an example, pixels in a 2×2 matrix may each include a photoelectric conversion element and may share a floating diffusion node and a pixel circuit with one another, as shown in FIG. 12. Accordingly, pixels in a 2×2 matrix may operate as a single big pixel, e.g., PX_R1, PX_Gr1, PX_Gb1, or PX_B1, as shown in FIG. 11B. Big pixels may form a Bayer pattern. Accordingly, the binning method according to the example embodiment may be applied, as described above. The first row Row1 and the third row Row3 may be simultaneously read out during the first horizontal period, and the second row Row2 and the fourth row Row4 may be simultaneously read out during the second horizontal period.

FIG. 12 illustrates an example of a pixel according to an example embodiment.

Referring to FIG. 12, a pixel PXa may include a plurality of photoelectric conversion elements 22a, 22b, 22c, and 22d and a pixel circuit 12. For example, the pixel PXa may include four photoelectric conversion elements 22a, 22b, 22c, and 22d. In some embodiments, the photoelectric conversion elements 22a, 22b, 22c, and 22d may respectively include photodiodes PD1A, PD1B, PD1C, and PD1D. A microlens may be arranged above each of the photoelectric conversion elements 22a, 22b, 22c, and 22d. Accordingly, a combination of a microlens and a photoelectric conversion element may be referred to as a single pixel, and therefore, the pixel PXa of FIG. 12 may be regarded as four pixels.

The pixel circuit 12 may include four transfer transistors TX1 through TX4 respectively connected to the photoelectric conversion elements 22a, 22b, 22c, and 22d, a reset transistor RX1, a drive transistor DX1, and a select transistor SX1.

A floating diffusion node FD1 may be shared by the four photoelectric conversion elements 22a, 22b, 22c, and 22d and the four transfer transistors TX1 through TX4. The reset transistor RX1 may be turned on in response to the reset signal RS1 to reset the floating diffusion node FD1 with the power voltage VDD. Each of the transfer transistors TX1 through TX4 may connect or disconnect a corresponding one of the photodiodes PD1A, PD1B, PD1C, and PD1D to or from the floating diffusion node FD1 according to a voltage of a corresponding one of transfer gates TG1, TG2, TG3, and TG4.

Light incident to each of the photodiodes PD1A, PD1B, PD1C, and PD1D may be accumulated as charges therein through photoelectric conversion. When the charges accumulated in each of the photodiodes PD1A, PD1B, PD1C, and PD1D are transferred to the floating diffusion node FD1, the charges may be output as a first analog voltage V1out via the drive transistor DX1 and the select transistor SX1. The first analog voltage V1out corresponding to a voltage change in the floating diffusion node FD1 may be transmitted to an external readout circuit (not shown).

The pixel PXa may be applied to the pixel array 110a of FIG. 11A. For example, the four photoelectric conversion elements 22a, 22b, 22c, and 22d of the pixel PXa may respectively correspond to pixels in a 2×2 matrix. In other words, the pixels in a 2×2 matrix may share the floating diffusion node FD1, like the pixel PXa of FIG. 12. When the transfer transistors TX1 through TX4 are simultaneously turned on or off, the pixels in a 2×2 matrix may operate as a single big pixel, as shown in FIG. 11B. In an embodiment, when the pixel PXa operates as a big pixel, only some of the transfer transistors TX1 through TX4 may be turned on or off while the others of the transfer transistors TX1 through TX4 remain turned off.

Figure 13:
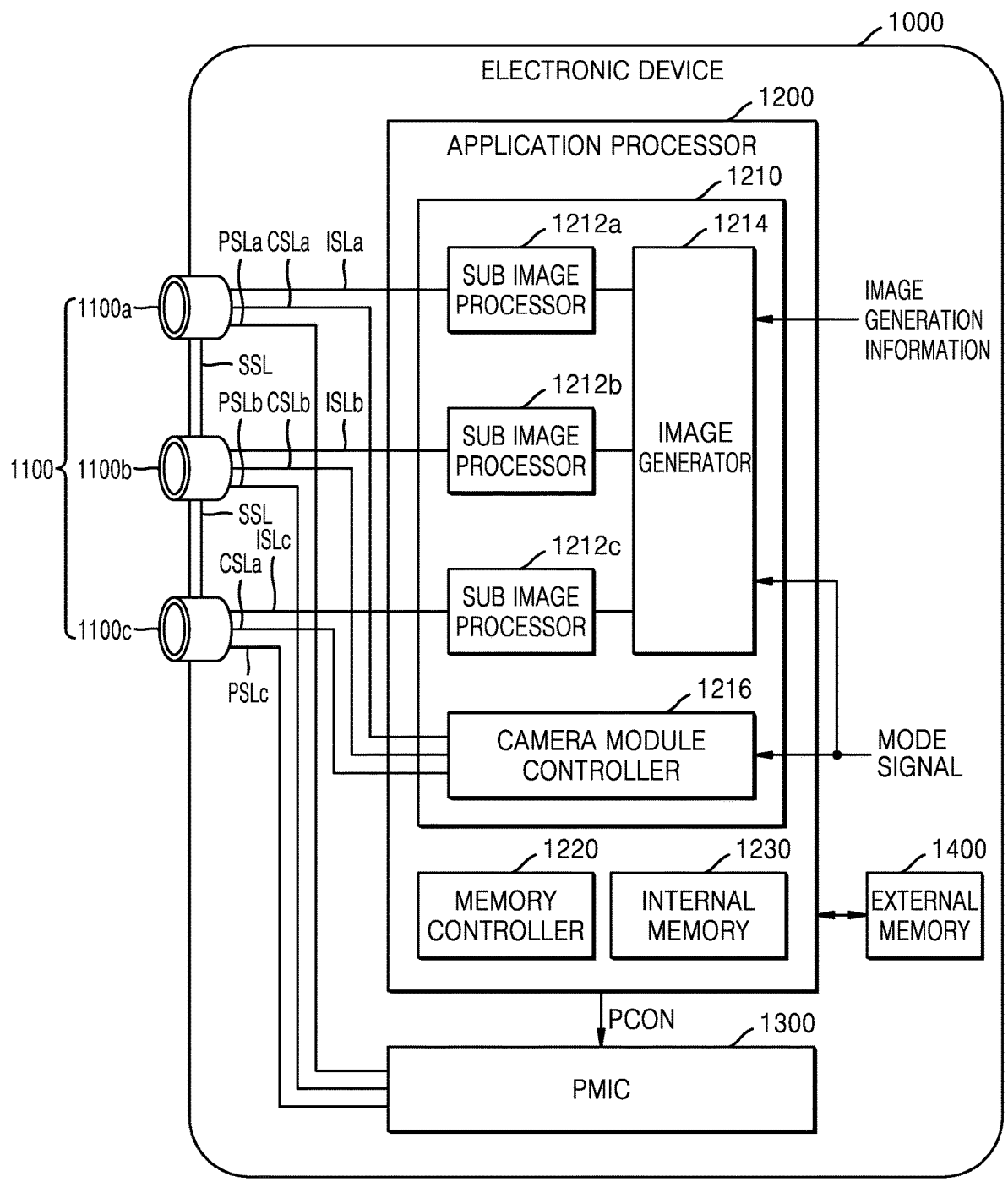
FIG. 13 is a block diagram of an electronic device including a multi-camera module using an image sensor, according to an example embodiment.
Figure 14:
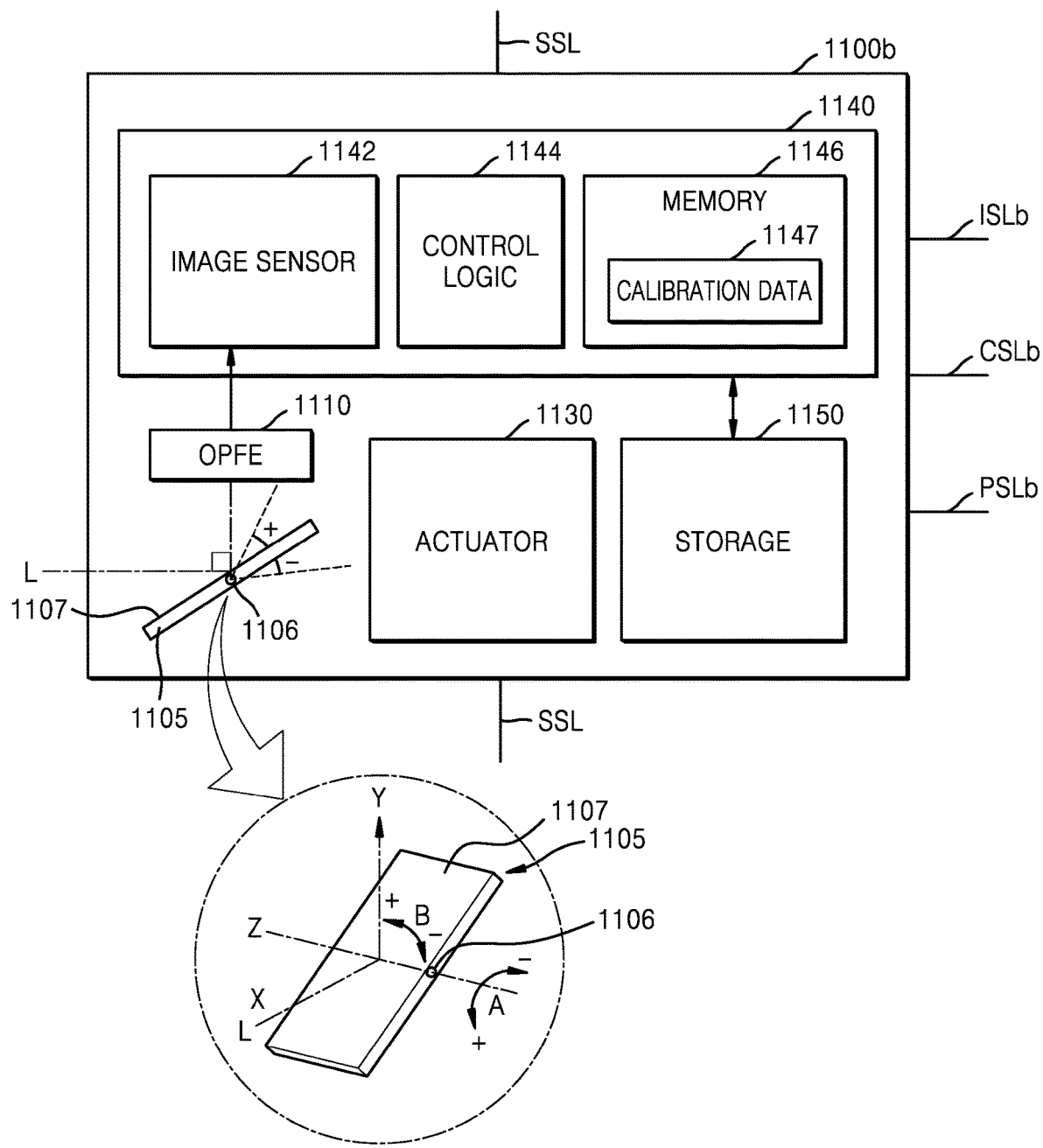
FIG. 14 is a detailed block diagram of a camera module in FIG. 13.

FIG. 13 is a block diagram of an electronic device including a multi-camera module using an image sensor, according to an example embodiment. FIG. 14 is a detailed block diagram of a camera module in FIG. 13.

Referring to FIG. 13, an electronic device 1000 may include a camera module group 1100, an application processor 1200, a power management integrated circuit (PMIC) 1300, and an external memory 1400.

The camera module group 1100 may include a plurality of camera modules 1100a, 1100b, and 1100c. Although three camera modules 1100a, 1100b, and 1100c are illustrated in FIG. 13, embodiments are not limited thereto. In some embodiments, the camera module group 1100 may be modified to include only two camera modules. In some embodiments, the camera module group 1100 may be modified to include "n" camera modules, where "n" is a natural number of at least 4.

The detailed configuration of the camera module 1100b will be described with reference to FIG. 14 below. The descriptions below may also applied to the other camera modules 1100a and 1100c.

Referring to FIG. 14, the camera module 1100b may include a prism 1105, an optical path folding element (OPFE) 1110, an actuator 1130, an image sensing device 1140, and a storage 1150.

The prism 1105 may include a reflective surface 1107 of a light reflecting material and may change the path of light L incident from outside.

In some embodiments, the prism 1105 may change the path of the light L incident in a first direction X into a second direction Y perpendicular to the first direction X. The prism 1105 may rotate the reflective surface 1107 of the light reflecting material in a direction A around a central shaft 1106 or rotate the central shaft 1106 in a direction B so that the path of the light L incident in the first direction X is changed into the second direction Y perpendicular to the first direction X. At this time, the OPFE 1110 may move in a third direction Z, which is perpendicular to the first and second directions X and Y.

In some embodiments, an A-direction maximum rotation angle of the prism 1105 may be less than or equal to 15 degrees in a plus (+) A direction and greater than 15 degrees in a minus (-) A direction, but embodiments are not limited thereto.

In some embodiment, the prism 1105 may move by an angle of about 20 degrees or in a range from about 10 degrees to about 20 degrees or from about 15 degrees to about 20 degrees in a plus or minus B direction. At this time, an angle by which the prism 1105 moves in the plus B direction may be the same as or similar, within a difference of about 1 degree, to an angle by which the prism 1105 moves in the minus B direction.

In some embodiments, the prism 1105 may move the reflective surface 1107 of the light reflecting material in the third direction Z parallel with an extension direction of the central shaft 1106.

The OPFE 1110 may include, for example, "m" optical lenses, where "m" is a natural number. The "m" lenses may move in the second direction Y and change an optical zoom ratio of the camera module 1100b. For example, when the default optical zoom ratio of the camera module 1100b is Z, the optical zoom ratio of the camera module 1100b may be changed to 3Z, 5Z, or greater by moving the "m" optical lenses included in the OPFE 1110.

The actuator 1130 may move the OPFE 1110 or an optical lens to a certain position. For example, the actuator 1130 may adjust the position of the optical lens such that an image sensor 1142 is positioned at a focal length of the optical lens for accurate sensing.

The image sensing device 1140 may include the image sensor 1142, a control logic 1144, and a memory 1146. The image sensor 1142 may sense an image of an object using the light L provided through the optical lens. The image sensor 100 of FIG. 1, which performs a binning method according to an example embodiment, may be used as the image sensor 1142. Accordingly, when the image sensing device 1140 operates in the first mode, a frame rate and image quality may increase and the size of image data generated by the image sensing device 1140 may decrease. For example, the frame rate may be an achievable frame rate based on circuit interface bandwidth and computational bandwidth. The image sensor 100 (providing example details of image sensor 1142) permits this frame rate to be high.

The control logic 1144 may generally control operations of the camera module 1100b. For example, the control logic 1144 may control operation of the camera module 1100b according to a control signal provided through a control signal line CSLb.

The memory 1146 may store information, such as calibration data 1147, necessary for the operation of the camera module 1100b. The calibration data 1147 may include information, which is necessary for the camera module 1100b to generate image data using the light L provided from outside. For example, the calibration data 1147 may include information about the degree of rotation described above, information about a focal length, information about an optical axis, or the like. When the camera module 1100b is implemented as a multi-state camera that has a focal length varying with the position of the optical lens, the calibration data 1147 may include a value of a focal length for each position (or state) of the optical lens and information about auto focusing.

The storage 1150 may store image data sensed by the image sensor 1142. The storage 1150 may be provided outside the image sensing device 1140 and may form a stack with a sensor chip of the image sensing device 1140. In some embodiments, the storage 1150 may include electrically erasable programmable read-only memory (EEPROM), but embodiments are not limited thereto.

Referring to FIGS. 13 and 14, in some embodiments, each of the camera modules 1100a, 1100b, and 1100c may include the actuator 1130. Accordingly, the camera modules 1100a, 1100b, and 1100c may include the calibration data 1147, which is the same or different among the camera modules 1100a, 1100b, and 1100c according to the operation of the actuator 1130 included in each of the camera modules 1100a, 1100b, and 1100c.

In some embodiments, one (e.g., the camera module 1100b) of the camera modules 1100a, 1100b, and 1100c may be of a folded-lens type including the prism 1105 and the OPFE 1110 while the other camera modules (e.g., the camera modules 1100a and 1100c) may be of a vertical type that does not include the prism 1105 and the OPFE 1110. However, embodiments are not limited thereto.

In some embodiments, one (e.g., the camera module 1100c) of the camera modules 1100a, 1100b, and 1100c may include a vertical depth camera, which extracts depth information using an infrared ray (IR). In this case, the application processor 1200 may generate a three-dimensional (3D) depth image by merging image data provided from the depth camera with image data provided from another camera module (e.g., the camera module 1100a or 1100b).

In some embodiments, at least two camera modules (e.g., 1100a and 1100b) among the camera modules 1100a, 1100b, and 1100c may have different field-of-views. In this case, the two camera modules (e.g., 1100a and 1100b) among the camera modules 1100a, 1100b, and 1100c may respectively have different optical lenses, but embodiments are not limited thereto.

In some embodiments, the camera modules 1100a, 1100b, and 1100c may have different field-of-views from one another. In this case, the camera modules 1100a, 1100b, and 1100c may respectively have different optical lenses, but embodiments are not limited thereto.

In some embodiments, the camera modules 1100a, 1100b, and 1100c may be physically separated from one another. In other words, the sensing area of the image sensor 1142 is not divided and used by the camera modules 1100a, 1100b, and 1100c, but the image sensor 1142 may be independently included in each of the camera modules 1100a, 1100b, and 1100c.

Referring back to FIG. 13, the application processor 1200 may include an image processing unit 1210, a memory controller 1220, and an internal memory 1230. The application processor 1200 may be separately implemented from the camera modules 1100a, 1100b, and 1100c. For example, the application processor 1200 and the camera modules 1100a, 1100b, and 1100c may be implemented in different semiconductor chips.

The image processing unit 1210 may include a plurality of sub image processors 1212a, 1212b, and 1212c, an image generator 1214, and a camera module controller 1216.

The image processing unit 1210 may include as many sub image processors 1212a, 1212b, and 1212c as the camera modules 1100a, 1100b, and 1100c.

Image data generated from each of the camera modules 1100a, 1100b, and 1100c may be provided to a corresponding one of the sub image processors 1212a, 1212b, and 1212c through a corresponding one of image signal lines ISLa, ISLb, and ISLc, which are separated from one another. For example, image data generated from the camera module 1100a may be provided to the sub image processor 1212a through the image signal line ISLa, image data generated from the camera module 1100b may be provided to the sub image processor 1212b through the image signal line ISLb, and image data generated from the camera module 1100c may be provided to the sub image processor 1212c through the image signal line ISLc. Such image data transmission may be performed using, for example, a mobile industry processor interface (MIPI) based camera serial interface (CSI), but embodiments are not limited thereto.

In some embodiments, a single sub image processor may be provided for a plurality of camera modules. For example, differently from FIG. 13, the sub image processors 1212a and 1212c may not be separated but may be integrated into a single sub image processor, and the image data provided from the camera module 1100a or the camera module 1100c may be selected by a selection element (e.g., a multiplexer) and then provided to the integrated sub image processor.

The image data provided to each of the sub image processors 1212a, 1212b, and 1212c may be provided to the image generator 1214. The image generator 1214 may generate an output image using the image data provided from each of the sub image processors 1212a, 1212b, and 1212c according to image generation information or a mode signal.

In detail, the image generator 1214 may generate the output image by merging at least portions of respective pieces of image data, which are respectively generated from the camera modules 1100a, 1100b, and 1100c having different field-of-views, according to the image generation information or the mode signal. Alternatively, the image generator 1214 may generate the output image by selecting one of pieces of image data, which are respectively generated from the camera modules 1100a, 1100b, and 1100c having different field-of-views, according to the image generation information or the mode signal.

In some embodiments, the image generation information may include a zoom signal or a zoom factor. In some embodiments, the mode signal may be based on a mode selected by a user.

When the image generation information includes a zoom signal or a zoom factor and the camera modules 1100a, 1100b, and 1100c have different field-of-views, the image generator 1214 may perform different operations according to different kinds of zoom signals. For example, when the zoom signal is a first signal, the image generator 1214 may merge the image data output from the camera module 1100a with the image data output from the camera module 1100c and may generate an output image using a merged image signal and the image data output from the camera module 1100b, which has not been used during the merging. When the zoom signal is a second signal different from the first signal, the image generator 1214 may generate an output image by selecting one of the pieces of image data respectively output from the camera modules 1100a, 1100b, and 1100c, instead of performing the merging. However, embodiments are not limited thereto, and a method of processing image data may be changed whenever necessary.

In some embodiments, the image generator 1214 may receive a plurality of pieces of image data, which have different exposure times, from at least one of the sub image processors 1212a, 1212b, and 1212c and perform high dynamic range (HDR) processing on the pieces of image data, thereby generating merged image data having an increased dynamic range.

The camera module controller 1216 may provide a control signal to each of the camera modules 1100a, 1100b, and 1100c. A control signal generated by the camera module controller 1216 may be provided to a corresponding one of the camera modules 1100a, 1100b, and 1100c through a corresponding one of control signal lines CSLa, CSLb, and CSLc, which are separated from one another.

One (e.g., the camera module 1100b) of the camera modules 1100a, 1100b, and 1100c may be designated as a master camera according to the mode signal or the image generation signal including a zoom signal, and the other camera modules (e.g., 1100a and 1100c) may be designated as slave cameras. Such designation information may be included in a control signal and provided to each of the camera modules 1100a, 1100b, and 1100c through a corresponding one of control signal lines CSLa, CSLb, and CSLc, which are separated from one another.

A camera module operating as a master or a slave may be changed according to a zoom factor or an operation mode signal. For example, when the field-of-view of the camera module 1100a is greater than that of the camera module 1100b and the zoom factor indicates a low zoom ratio, the camera module 1100b may operate as a master and the camera module 1100a may operate as a slave. Contrarily, when the zoom factor indicates a high zoom ratio, the camera module 1100a may operate as a master and the camera module 1100b may operate as a slave.

In some embodiments, a control signal provided from the camera module controller 1216 to each of the camera modules 1100a, 1100b, and 1100c may include a sync enable signal. For example, when the camera module 1100b is a master camera and the camera module 1100a is a slave camera, the camera module controller 1216 may transmit the sync enable signal to the camera module 1100*b*. The camera module 1100*b* provided with the sync enable signal may generate a sync signal based on the sync enable signal and may provide the sync signal to the camera modules 1100*a* and 1100*c* through a sync signal line SSL. The camera modules 1100*a*, 1100*b*, and 1100*c* may be synchronized with the sync signal and may transmit image data to the application processor 1200.

In some embodiments, a control signal provided from the camera module controller 1216 to each of the camera modules 1100*a*, 1100*b*, and 1100*c* may include mode information according to the mode signal. The camera modules 1100*a*, 1100*b*, and 1100*c* may operate in a first operation mode or a second operation mode in relation with a sensing speed based on the mode information.

In the first operation mode, the camera modules 1100*a*, 1100*b*, and 1100*c* may generate an image signal at a first speed (e.g., at a first frame rate), encode the image signal at a second speed higher than the first speed (e.g., at a second frame rate higher than the first frame rate), and transmit an encoded image signal to the application processor 1200. At this time, the second speed may be at most 30 times the first speed.

The application processor 1200 may store the received image signal, i.e., the encoded image signal, in the internal memory 1230 therein or the external memory 1400 outside the application processor 1200. Thereafter, the application processor 1200 may read the encoded image signal from the internal memory 1230 or the external memory 1400, decode the encoded image signal, and display image data generated based on a decoded image signal. For example, a corresponding one of the sub image processors 1212*a*, 1212*b*, and 1212*c* of the image processing unit 1210 may perform the decoding and may also perform image processing on the decoded image signal.

In the second operation mode, the camera modules 1100*a*, 1100*b*, and 1100*c* may generate an image signal at a third speed lower than the first speed (e.g., at a third frame rate lower than the first frame rate) and transmit the image signal to the application processor 1200. The image signal provided to the application processor 1200 may not have been encoded. The application processor 1200 may perform image processing on the image signal or store the image signal in the internal memory 1230 or the external memory 1400.

The PMIC 1300 may provide power, e.g., a supply voltage, to each of the camera modules 1100*a*, 1100*b*, and 1100*c*. For example, under the control of the application processor 1200, the PMIC 1300 may provide first power to the camera module 1100*a* through a power signal line PSLa, second power to the camera module 1100*b* through a power signal line PSLb, and third power to the camera module 1100*c* through a power signal line PSLc.

The PMIC 1300 may generate power corresponding to each of the camera modules 1100*a*, 1100*b*, and 1100*c* and adjust the level of the power, in response to a power control signal PCON from the application processor 1200. The power control signal PCON may include a power adjustment signal for each operation mode of the camera modules 1100*a*, 1100*b*, and 1100*c*. For example, the operation mode may include a low-power mode. At this time, the power control signal PCON may include information about a camera module to operate in the low-power mode and a power level to be set. The same or different levels of power may be respectively provided to the camera modules 1100*a*, 1100*b*, and 1100*c*. The level of power may be dynamically changed.

While example embodiments have been particularly shown and described, it will be understood that various changes in form and details may be made therein without departing from the spirit and scope of the following claims.

What is claimed is:

1. A binning method of an image sensor, the binning method comprising:
    reading out a plurality of pixel signals from at least two rows of each of a plurality of areas of a pixel array at a time, each area of the plurality of areas including a plurality of pixels arranged in a 2n×2n matrix, where n is an integer equal to or greater than 2;
    generating first image data by performing analog-to-digital conversion on the plurality of pixel signals;
    generating, based on the first image data, a first summation value of each of a plurality of binning areas based on two pixel values corresponding to a same color in each of the plurality of binning areas, the plurality of binning areas corresponding to the plurality of areas of the pixel array; and
    generating a second summation value of each of two binning areas based on two first summation values corresponding to a same color in the two binning areas, the two binning areas being adjacent to each other in a column direction among the plurality of binning areas.

2. The binning method of claim 1, wherein the reading out of the plurality of pixel signals includes simultaneously reading out pixel signals from at least two first pixels having a first color, the at least two first pixels being in a first column of the pixel array, and reading out a pixel signal from one second pixel of at least two second pixels having a second color, the at least two second pixels being in a second column of the pixel array.

3. The binning method of claim 2, wherein the one second pixel is in an outer region of each of the plurality of areas among the at least two second pixels.

4. The binning method of claim 2, wherein the generating of the first image data includes:
    receiving, by an analog-to-digital conversion circuit, a summation signal through a first column line, the summation signal corresponding to a sum of the pixel signals of the at least two first pixels; and
    generating, by the analog-to-digital conversion circuit, a pixel value for a first sampling position by performing the analog-to-digital conversion on the summation signal, the first sampling position corresponding to a middle point between the at least two first pixels.

5. The binning method of claim 1, wherein the generating of the first summation value includes applying a weight to each of the two pixel values and summing weighted values.

6. The binning method of claim 5, wherein the weight applied to each of the two pixel values is set based on a second sampling position, at which the first summation value is located.

7. The binning method of claim 1, wherein the generating of the second summation value includes:
    applying a weight to each of the two first summation values and summing weighted values; and
    generating the second summation value as a pixel value for a third sampling position.

8. The binning method of claim 1, further comprising:
    generating a third summation value based on at least two first pixel values of each of the plurality of binning areas of the first image data and a first pixel value of an adjacent binning area that is adjacent to each of the plurality of binning areas; and merging the second summation value with the third summation value for at least two first pixels.

9. The binning method of claim 8, wherein the merging is performed based on a difference between a first pixel value of each of the plurality of binning areas and the first pixel value of the adjacent binning area,
wherein the third summation value is included in output image data when the difference is less than a first threshold value,
the second summation value is included in the output image data when the difference exceeds a second threshold value, and
when the difference is greater than or equal to the first threshold value and is less than or equal to the second threshold value:
a weight based on the difference is applied to each of the second summation value and the third summation value, and
a sum of weighted values is included in the output image data.

10. An image sensor comprising:
a pixel array divided into a plurality of areas having a quadrangular shape, each area of the plurality of areas including pixels arranged in a 2n×2n matrix, where n is an integer equal to or greater than 2;
an analog-to-digital conversion circuit configured to:
read out a plurality of pixel signals, and
convert the plurality of pixel signals into first image data, the first image data comprising a plurality of pixel values, and the plurality of pixel signals being received from the pixel array through a plurality of column lines;
a row driver configured to provide control signals through a plurality of row lines connected to the pixel array, the control signals being configured to control pixel signals of at least two rows of the pixel array to be simultaneously output;
a line buffer configured to store the first image data in certain line units; and
a processor configured to:
perform binning on the first image data stored in the line buffer,
generate a first summation value of each of a plurality of binning areas based on two pixel values corresponding to a same color in each of the plurality of binning areas, the plurality of binning areas being included in the first image data, and
generate a second summation value of each of two binning areas based on two first summation values corresponding to the same color in the two binning areas, the two binning areas being adjacent to each other in a column direction among the plurality of binning areas.

11. The image sensor of claim 10, wherein the row driver is further configured to control at least two first pixels to simultaneously output pixel signals and one second pixel of at least two second pixels to output a pixel signal, the at least two first pixels being in a first column of the at least two rows of the pixel array, and the at least two second pixels being in a second column of the at least two rows of the pixel array.

12. The image sensor of claim 11, wherein the analog-to-digital conversion circuit is further configured to:
receive a summation signal through a first column line, and
generate a pixel value for a first sampling position by performing analog-to-digital conversion on the summation signal, the summation signal corresponding to a sum of the pixel signals of the at least two first pixels, and the first sampling position corresponding to a middle point between the at least two first pixels.

13. The image sensor of claim 10, wherein the processor is further configured to:
apply a weight to each of the two pixel values, and
sum weighted values, the weight being set based on a second sampling position, at which the first summation value is located.

14. The image sensor of claim 10, wherein the processor is further configured to calculate a third summation value based on at least two first pixel values of each of the plurality of binning areas of the first image data and a first pixel value of an adjacent binning area that is adjacent to each of the plurality of binning areas and to merge the second summation value with the third summation value for at least two first pixels.

15. The image sensor of claim 10, wherein each of the plurality of areas includes a Bayer pattern having a red pixel, two green pixels, and a blue pixel repeatedly arranged.

16. An image processing system comprising:
an image sensor configured to sense an optical signal and generate image data; and
a first processor configured to receive and process the image data from the image sensor,
wherein the image sensor includes:
a pixel array divided into a plurality of areas having a quadrangular shape, each area of the plurality of areas including pixels arranged in a 4×4 matrix;
an analog-to-digital conversion circuit configured to:
read out a plurality of pixel signals, and
convert the plurality of pixel signals into first image data, the first image data comprising a plurality of pixel values, the plurality of pixel signals being received from the pixel array through a plurality of column lines;
a row driver configured to provide control signals through a plurality of row lines connected to the pixel array, the control signals configured to control pixel signals of at least two rows of the pixel array to be simultaneously output;
a line buffer configured to store first image data in certain line units; and
a second processor configured to:
perform binning on the first image data stored in the line buffer,
generate a first summation value of each of a plurality of binning areas based on two pixel values corresponding to a same color in each of the plurality of binning areas, the plurality of binning areas being included in the first image data, and
generate a second summation value of each of two binning areas based on two first summation values corresponding to the same color in the two binning areas, the two binning areas being adjacent to each other in a column direction among the plurality of binning areas.

17. The image processing system of claim 16, wherein the second processor is further configured to:
calculate a third summation value based on at least two first pixel values of each of the plurality of binning areas of the first image data and a first pixel value of another binning area adjacent to each of the plurality of binning areas, and
merge the second summation value with the third summation value for at least two first pixels.

* * * * *